US012658439B2

(12) United States Patent
Kiggins et al.

(10) Patent No.: US 12,658,439 B2
(45) Date of Patent: Jun. 16, 2026

(54) LCO ELECTRODES AND BATTERIES FABRICATED THEREFROM

(71) Applicant: XERION ADVANCED BATTERY CORP., Kettering, OH (US)

(72) Inventors: Chadd Kiggins, Dayton, OH (US); Mehmet Ates, Kettering, OH (US); John Cook, Beavercreek, OH (US)

(73) Assignee: XERION ADVANCED BATTERY CORP., Kettering, OH (US)

( * ) Notice: Subject to any disclaimer, the term of this patent is extended or adjusted under 35 U.S.C. 154(b) by 81 days.

(21) Appl. No.: 18/542,736

(22) Filed: Dec. 17, 2023

(65) Prior Publication Data

US 2024/0186507 A1     Jun. 6, 2024

Related U.S. Application Data

(63) Continuation of application No. 17/151,133, filed on Jan. 16, 2021, now abandoned.

(60) Provisional application No. 62/969,429, filed on Feb. 3, 2020.

(51) Int. Cl.
| | |
|---|---|
| *H01M 4/525* | (2010.01) |
| *C01G 51/42* | (2025.01) |
| *H01M 4/131* | (2010.01) |
| *H01M 4/66* | (2006.01) |
| *H01M 10/0525* | (2010.01) |
| H01M 4/02 | (2006.01) |

(52) U.S. Cl.
CPC ............ *H01M 4/525* (2013.01); *C01G 51/42* (2013.01); *H01M 4/131* (2013.01); *H01M 4/661* (2013.01); *H01M 10/0525* (2013.01); *C01P 2002/72* (2013.01); *C01P 2002/76* (2013.01); *C01P 2002/88* (2013.01); *C01P 2004/03* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,376,027 B1 | 4/2002 | Lee |
| 6,982,132 B1 | 1/2006 | Goldner |
| 7,959,769 B2 | 6/2011 | Zhang |
| (Continued) | | | |

FOREIGN PATENT DOCUMENTS

| | | |
|---|---|---|
| JP | 2008523567 | 7/2008 |
| JP | 2016540178 | 12/2016 |
| (Continued) | | |

OTHER PUBLICATIONS

Taiwan Patent Office, search report dated Apr. 12, 2024, related Taiwanese patent application No. 110102582, Taiwanese-language document, pp. 1-11, English-language translation of search report, pp. 12, machine translation of office action, pp. 13-23, with claims examined, pp. 23-30.

(Continued)

*Primary Examiner* — Carlos Barcena
(74) *Attorney, Agent, or Firm* — O'BANION & RITCHEY LLP; John P. O'Banion

(57) ABSTRACT

Electrodes for batteries, active stacks for batteries, batteries and methods of fabrication are described where the electrode has an LiCoO$_2$ (LCO) electrode layer with a (110), (101), (104), or (003) crystallographic orientation or combinations thereof.

18 Claims, 27 Drawing Sheets

(56) References Cited

U.S. PATENT DOCUMENTS

Figure 1A:
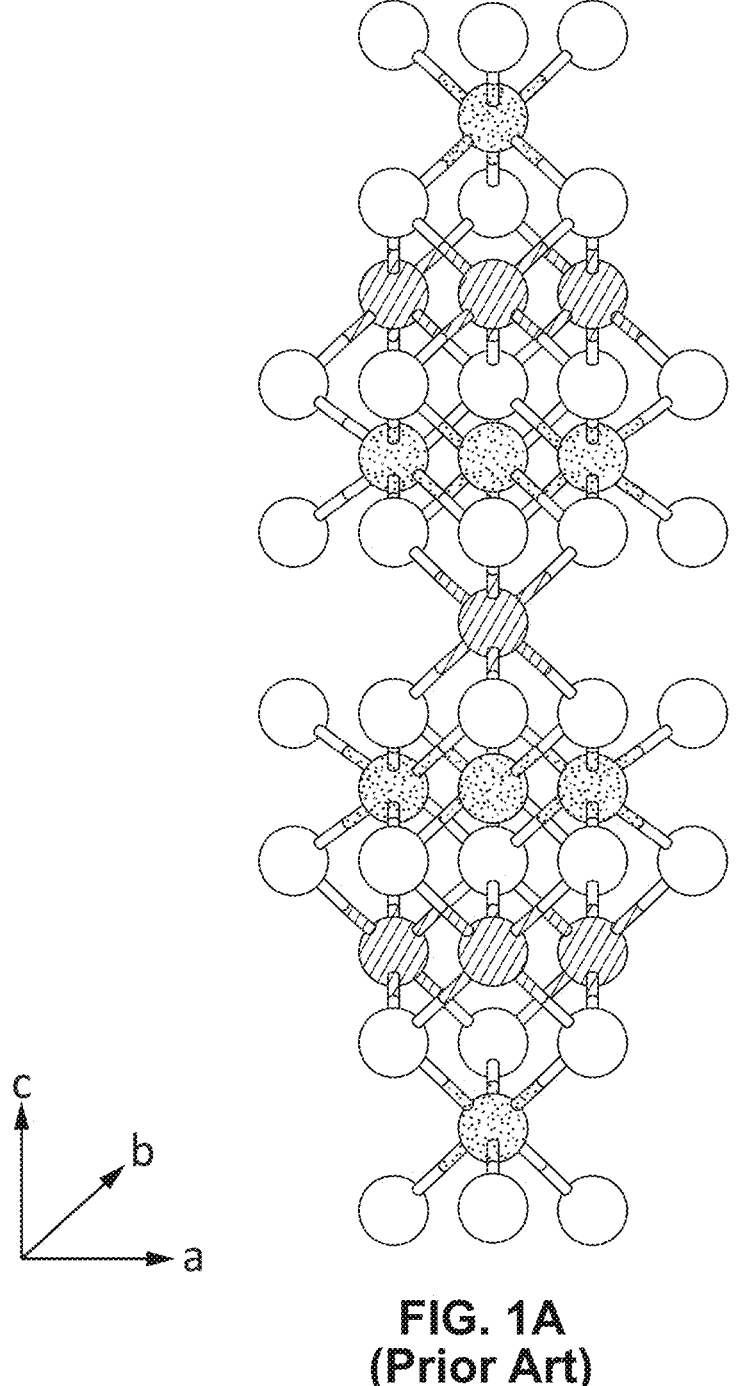

| | | | |
|---|---|---|---|
| 9,780,356 | B2 | 10/2017 | Zhang |
| 9,899,661 | B2 | 2/2018 | Huang |
| 10,727,545 | B1 | 7/2020 | Gan |
| 11,394,018 | B2 | 7/2022 | Zhang |
| 2001/0014423 | A1 | 8/2001 | Bates |
| 2009/0117471 | A1 | 5/2009 | Grey |
| 2010/0233542 | A1 | 9/2010 | Endo |
| 2013/0026409 | A1 | 1/2013 | Baker |
| 2013/0071661 | A1 | 3/2013 | Chen |
| 2013/0162216 | A1 | 6/2013 | Zhamu |
| 2015/0295245 | A1 | 10/2015 | Christensen |
| 2019/0181412 | A1 | 6/2019 | Li |
| 2021/0371297 | A1 | 12/2021 | Perkins |
| 2021/0391605 | A1 | 12/2021 | Wang |

FOREIGN PATENT DOCUMENTS

| | | | |
|---|---|---|---|
| JP | 201724952 | | 2/2017 |
| JP | 2017024952 | | 2/2017 |
| JP | 2017131863 | | 8/2017 |
| JP | 2019141807 | | 8/2019 |
| JP | 2021524986 | | 9/2021 |
| KR | 101127370 | | 3/2012 |
| KR | 1020190010408 | | 3/2019 |
| TW | 200746519 | | 12/2007 |
| WO | 200663308 | | 6/2006 |
| WO | 2007067526 | A2 | 6/2007 |
| WO | 2019193324 | | 10/2019 |
| WO | 2023193014 | | 10/2023 |

OTHER PUBLICATIONS

Korean Intellectual Property Office (KIPO), Request for the Submission of an Opinion issued Oct. 22, 2024, related Korean application No. 10-2022-7025442, Korean-language document, pp. 1-16, English-language document, 17-36, with claims searched, pp. 37-44.

Taiwan Patent Office, third official action issued Mar. 5, 2025, related Taiwanese patent application No. 110102582. Taiwanese-language document, pp. 1-2, English-language document, pp. 3-4, claims examined, pp. 5-9.

Japanese Patent Office, official action issued Mar. 25, 2025, related Japanese patent application No. 2024-028440. Japanese-language document, pp. 1-2, English-language document, pp. 3, claims examined, pp. 4.

Zhang, Huigang, et al., "Electroplating lithium transition metal oxides", Science Advances, vol. 3, May 12, 2017, pp. 1-8.

Pu, Jun, et al., "Electrodeposition Technologies for Li-Based Batteries: Frontiers of Energy Storage", Advanced Materials, vol. 32, 2020, pp. 1-28.

European Patent Office (epo), Communication (Extended European Search Report) issued Dec. 9, 2024, related European patent application No. 21751162.5, pp. 1-8, claims searched, 9-11.

Taiwan Patent Office, second official action issued Oct. 28, 2024, related Taiwanese patent application No. 110102582. Taiwanese-language document, pp. 1-2, English-language document, pp. 3-3, claims examined, pp. 4-8.

Canadian Intellectual Property Office, official action dated Aug. 30, 2024, related Canadian patent application No. 3,165,310, pp. 1-4, with claims examined, pp. 5-7.

Canadian Intellectual Property Office, official action dated Jul. 2, 2025, related Canadian patent application No. 3,245,972, pp. 1-5, with claims examined, pp. 6-9.

ISA/KR, Korean Intellectual Property Office, International Search Report and Written Opinion issued May 7, 2021, related PCT international application No. PCT/US2021/013767, pp. 1-10, claims searched, p. 11-18.

Yang, Chunpeng et al., "Protected Lithium-Metal Anodes in Batteries: From Liquid to Solid", Advanced Materials Lithium-Metal Batteries, 29, 2017, pp. 1-28.

Intellectual Property India, Examination Report issued Jan. 27, 2023, related Indian patent application No. 202217041531, pp. 1-6, claims examined, pp. 7-14.

Bouwman, P.J., et al., "Structure-related behavior of LiCoO2 films", Solid State Ionics, 152-153, 2002, pp. 181-188.

Canadian Intellectual Property Office, official action dated Jul. 4, 2023, related Canadian patent application No. 3,165,310, pp. 1-5, with claims examined, pp. 6-13.

IP Australia, Examination No. 1 issued Jul. 7, 2023, related Australian patent application No. 2021216845, pp. 1-6, with claims examined, 7-14.

Japan Patent Office (JPO), official action issued Aug. 29, 2023, related Japanese patent application No. 2022-545061, Japanese-language document pp. 1-3, with claims examined, pp. 4-12, and English language translation, pp. 13.

ISA/US, United States Patent and Trademark Office (USPTO), International Search Report and Written Opinion issued Dec. 12, 2023, related PCT international application No. PCT/US2023/065245, pp. 1-19, with claims searched, pp. 20-23.

IP Australia, Examination No. 1 issued Sep. 8, 2025, related Australian patent application No. 2023245969, pp. 1-5, with claims examined, 6-9.

Japan Patent Office (JPO), official action issued Oct. 15, 2025, related Japanese patent application No. 2022-556202, Japanese-language document pp. 1-3, with claims examined, pp. 4-6, and English language translation, pp. 7-10.

Chilean Patent Office (CLPO), official action issued Feb. 16, 2026, related Chilean patent application No. 202402827, Spanish language document, pp. 1-11, English language translation, pp. 12-22, with claims examined, pp. 23-26.

Chilean Patent Office (CLPO), search report issued Feb. 16, 2026, related Chilean patent application No. 202402827, Spanish language document, pp. 1-3, English language translation, pp. 4-6, with claims examined, pp. 7-10.

Yang, Heng, et al., "DirectPlate Redox Membrane Concept and Applications", Xerion Advanced Battery Corp., Mar. 30, 2022, pp. 1-59.

Kwon, Taeri, et al., "Synthesis of LiCoO2 epitaxial think films using a sol-gel method", Journal of Power Sources, vol. 274, 2015, pp. 417-423.

The Materials Project, "LiCoO2 mp-22526", Materials Explorer, Sep. 25, 2025, pp. 1-7.

European Patent Office (EPO), Communication (Extended European Search Report) issued Mar. 17, 2026, related European application No. 23782114.5, pp. 1-13, with claims searched, pp. 14-17.

Intellectual Property Corporation of Malaysia, Substantive Examination, issued Mar. 10, 2026, related Malaysian application No. PI2024005513, pp. 1-4, with claims searched, 5-8.

-First Cycle Efficiency=90.0%
-Specific Capacity = 135.0mAh/g
-Temp = 23C
-Coin Cell vs Li
-240um
-5%porosity
-C/5 Charge/Discharge
-Voltage Window = 4.3-3.0V

70

— 80

Fully Dense LCO — 78

— 76

Electrolyte

Lithium anode — 74

— 72

Columnar LCO SEM Cross Section

— 82

LCO

Aluminum

8um

92

96          96                    94

LCO

C-Axis

Aluminum Foil

Smooth, Columnar LCO SEM Cross Section

15um

98

10um

-First Cycle Efficiency = 86.3%
-Temp = 23C
-Coin Cell vs Li
-10um
-C/10 Charge/Discharge
-Voltage Window = 4.3-3.0V -Temp = 23C
-Coin Cell vs Li
-30um
-5%porosity
-C/5 Discharge
-Voltage Window = 4.3-3.0V

LCO ELECTRODES AND BATTERIES FABRICATED THEREFROM

CROSS-REFERENCE TO RELATED APPLICATIONS

This application is a continuation of U.S. patent application Ser. No. 17/151,133 filed on Jan. 16, 2021, incorporated herein by reference in its entirety, which claims priority to, and the benefit of, U.S. provisional patent application Ser. No. 62/969,429 filed on Feb. 3, 2020 which is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

BACKGROUND

1. Technical Field

The technology of this disclosure pertains generally to batteries, and more particularly to improved electrode technology for batteries.

Figure 1B:
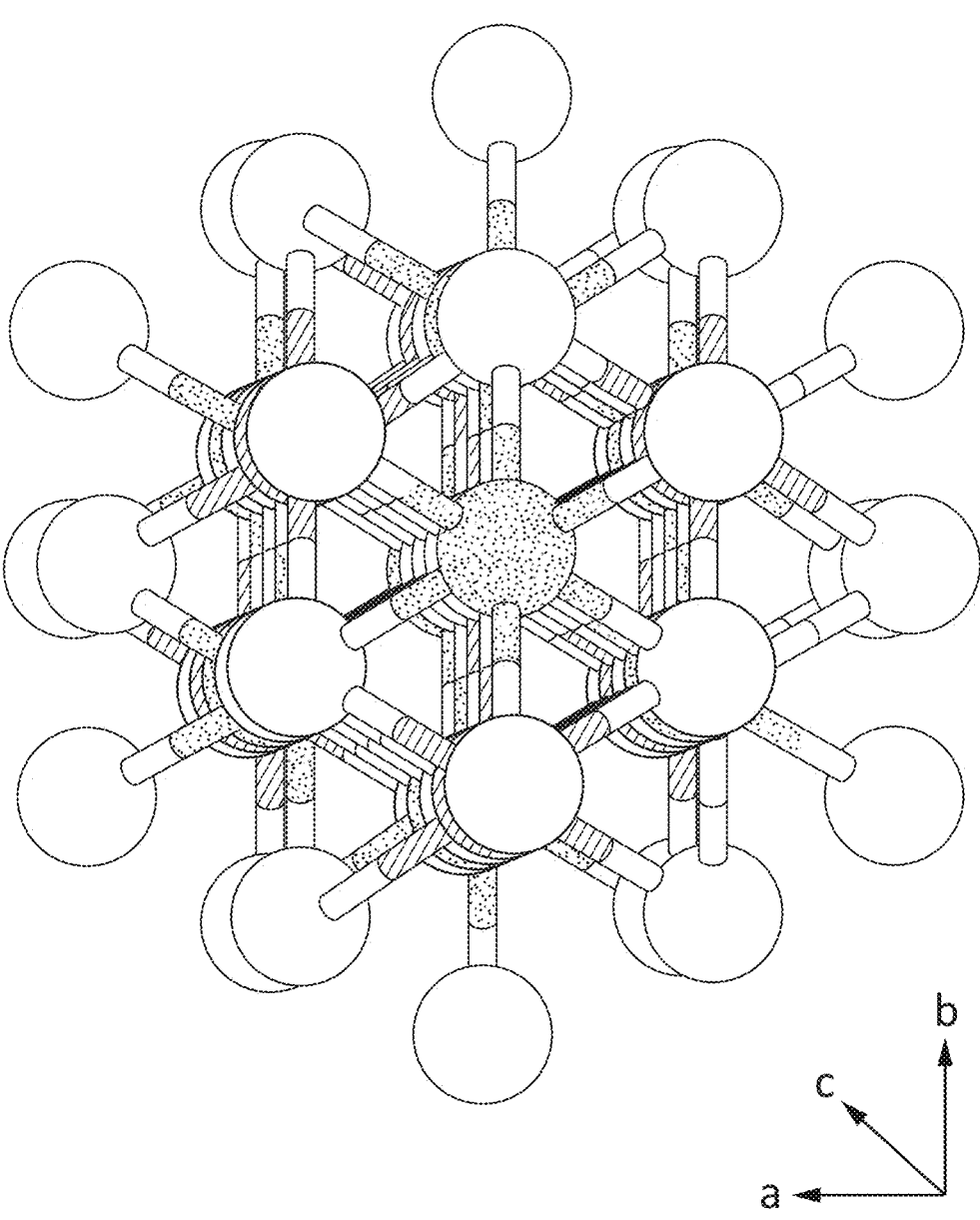

2. Background Discussion $LiCoO_2$ (LCO) is a crystalline material that can be described using space group $R\bar{3}m$ (166). LCO is a Li-ion conductor that is used in energy storage applications. The Li-ion and electronic conduction pathways are anisotropic, which does not allow for ion, or high electronic conduction along the c-axis of the unit cell as depicted in FIG. 1A and FIG. 1B which are from A. Jain, S. P. Ong, G. Hautier, W. Chen, W. D. Richards, S. Dacek, S. Cholia, D. Gunter, D. Skinner, G. Ceder, and K. A. Persson, The Materials Project: A materials genome approach to accelerating materials innovation, APL Materials, 2013, 1(1), 011002.

BRIEF SUMMARY

In one embodiment, the presented technology comprises a solid-state battery having a fully dense $LiCoO_2$ (LCO) electrode layer, a crystal orientation in the (110), (101), (104), or (003) directions, and a smooth surface.

In another embodiment, the presented technology comprises an electrode layer for a solid state battery, the electrode layer comprising a fully dense $LiCoO_2$ (LCO) electrode layer having a crystal orientation in the (110), (101), (104), or (003) directions and a smooth surface.

In a further embodiments, the presented technology comprises methods for fabricating the above-described battery and the above-described electrode layer.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1A and FIG. 1B: Ball and stick model of $LiCoO_2$ (LCO) with the c-axis in plane (FIG. 1A) and the a-axis and the b-axis out of plane (FIG. 1B), where in both figures the dotted patterning represents Co, the lined patterning represents Li, and the absence of patterning represents O.

Figure 2A:
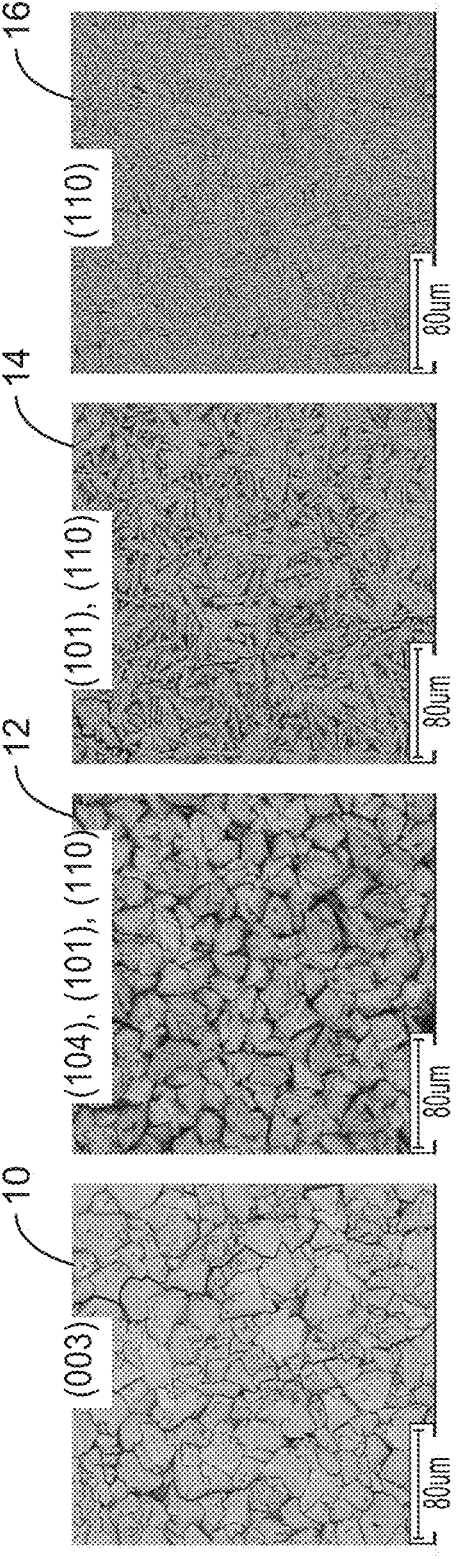

FIG. 2A: Scanning electron microscope images of LCO in various crystallographic orientations.

Figure 2B:
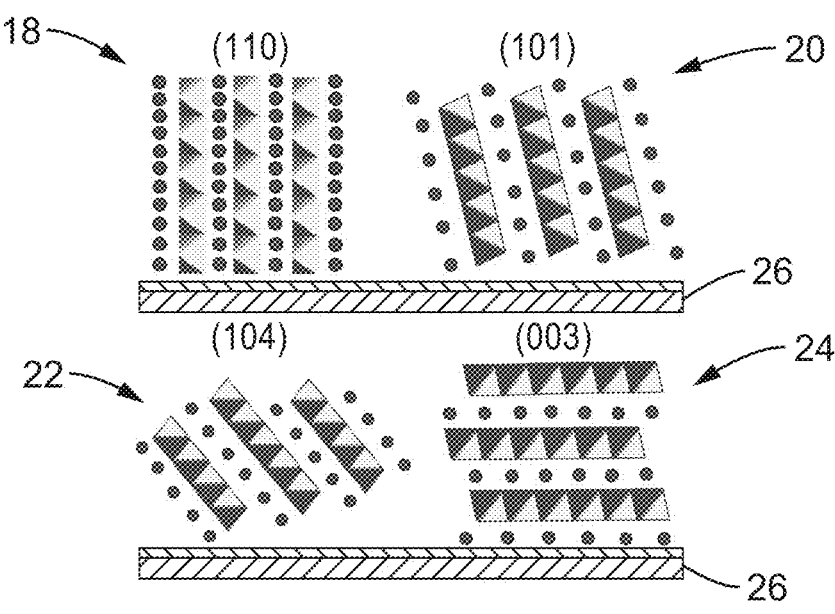

FIG. 2B: Schematic showing the different crystallographic orientations that enable the described technology.

Figure 2C:
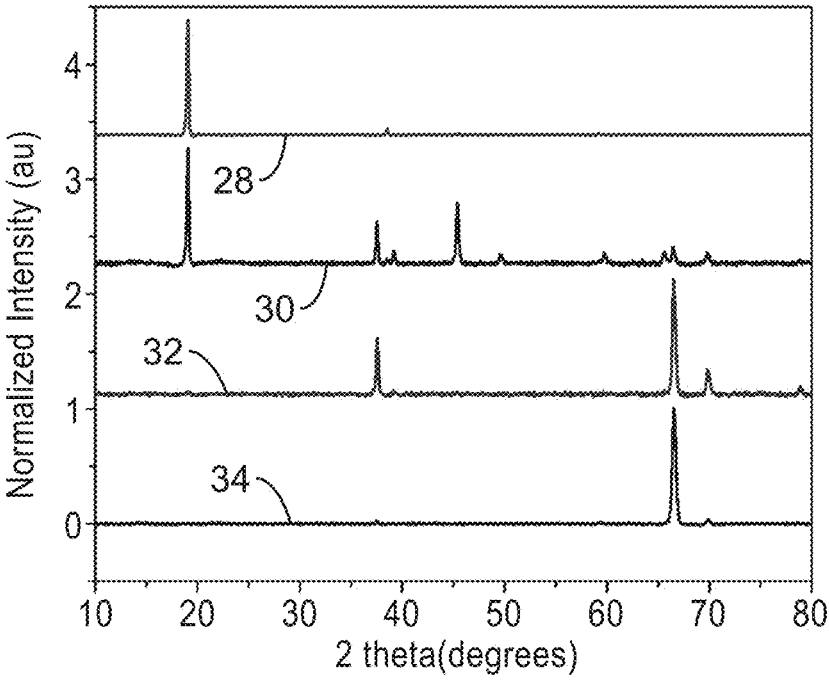

FIG. 2C: XRD of LCO in various crystallographic orientations.

Figure 2D:
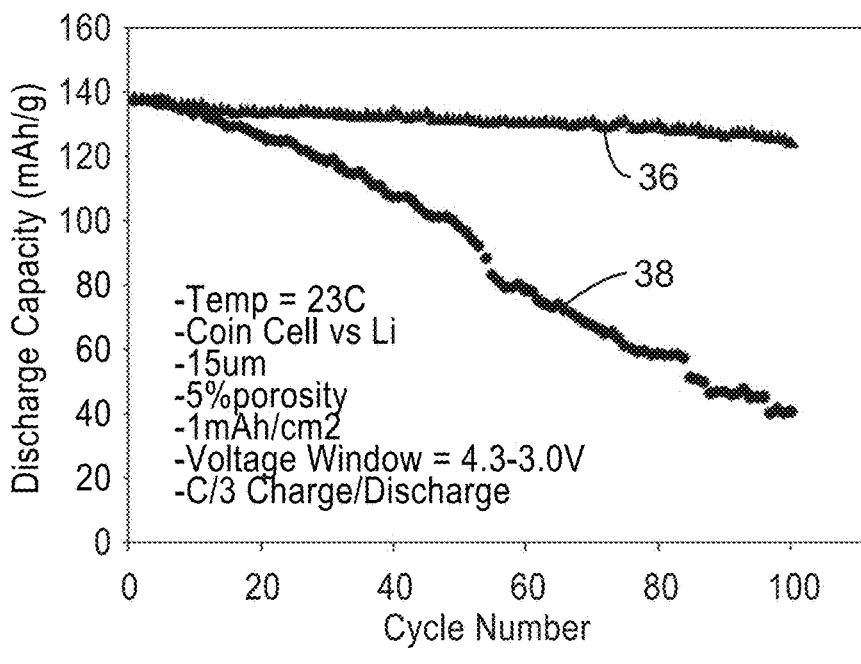

FIG. 2D: Cycle life of LCO in the (110) orientation at two different cut-off potentials (4.3 V upper trace and 4.5 V lower trace, both vs $Li/Li_+$).

Figure 2E:
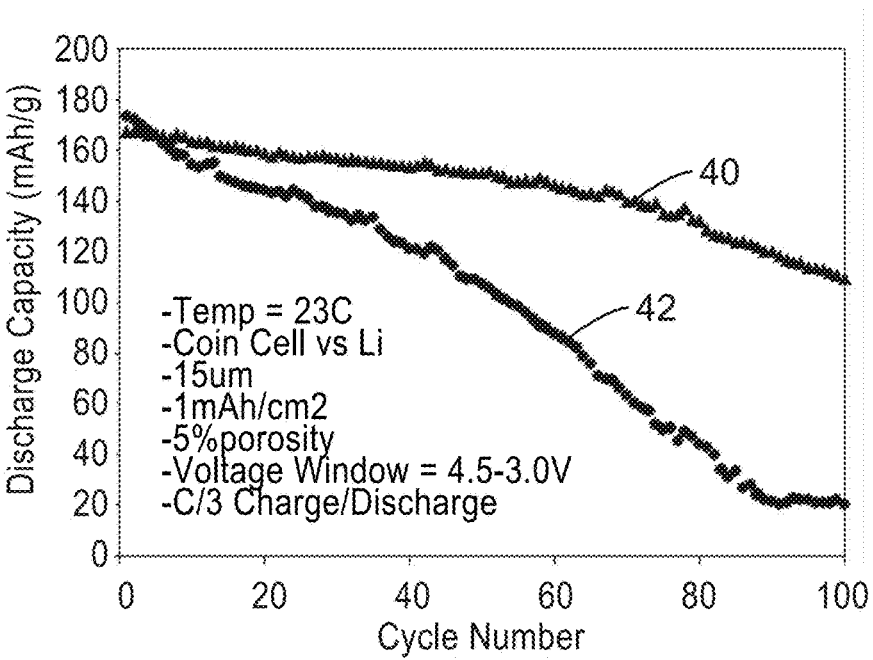

FIG. 2E: Cycle life of LCO in the (003) orientation at two different cut-off potentials (4.3 V upper trace and 4.5 V lower trace, both vs $Li/Li_+$).

Figure 3:
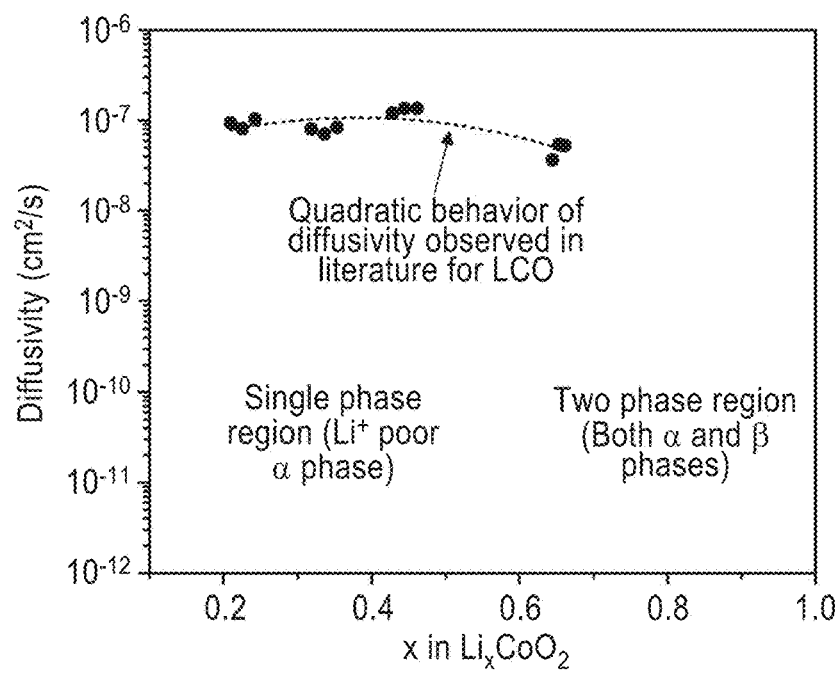

FIG. 3: A graph showing the diffusivity of XABC LCO grown in the (110) orientation measured by galvanostatic intermittent titration technique (in a three-electrode configuration) at various states of charge.

Figure 4A:
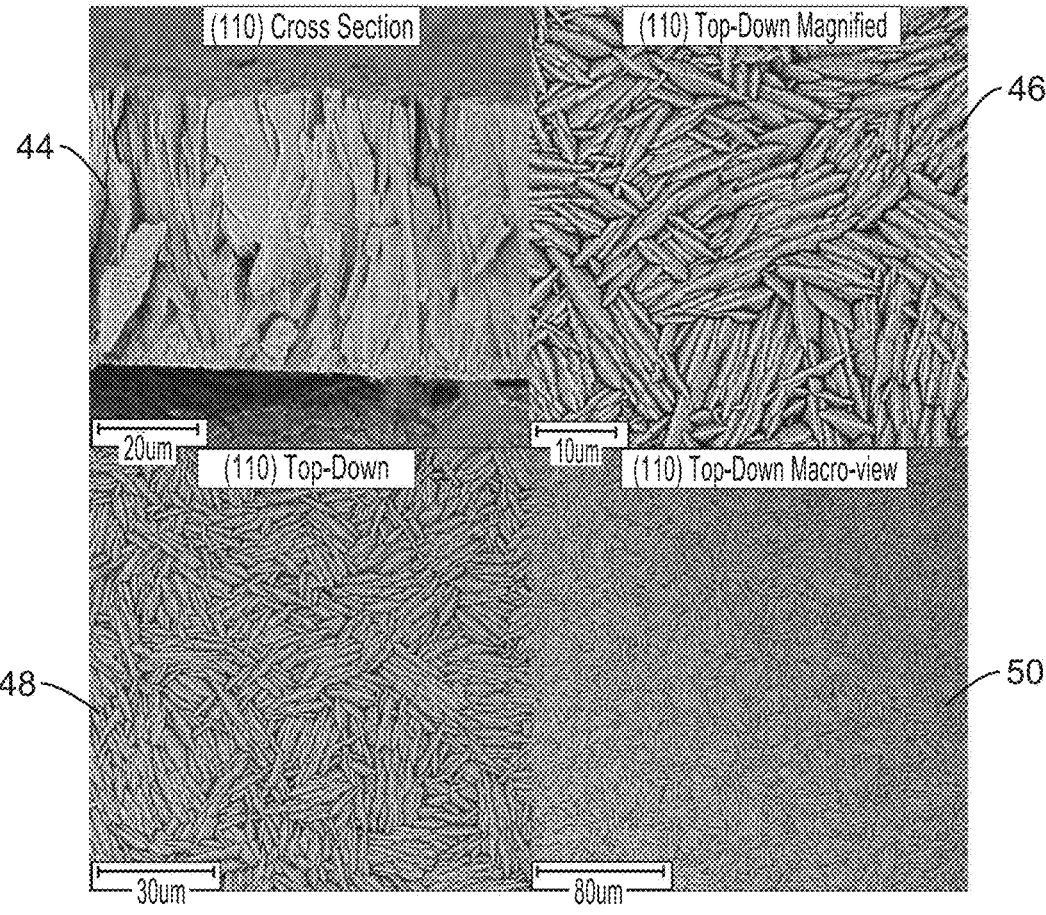

FIG. 4A: SEM of a 60 μm XABC LCO electrode that is oriented in the (110) direction.

Figure 4B:
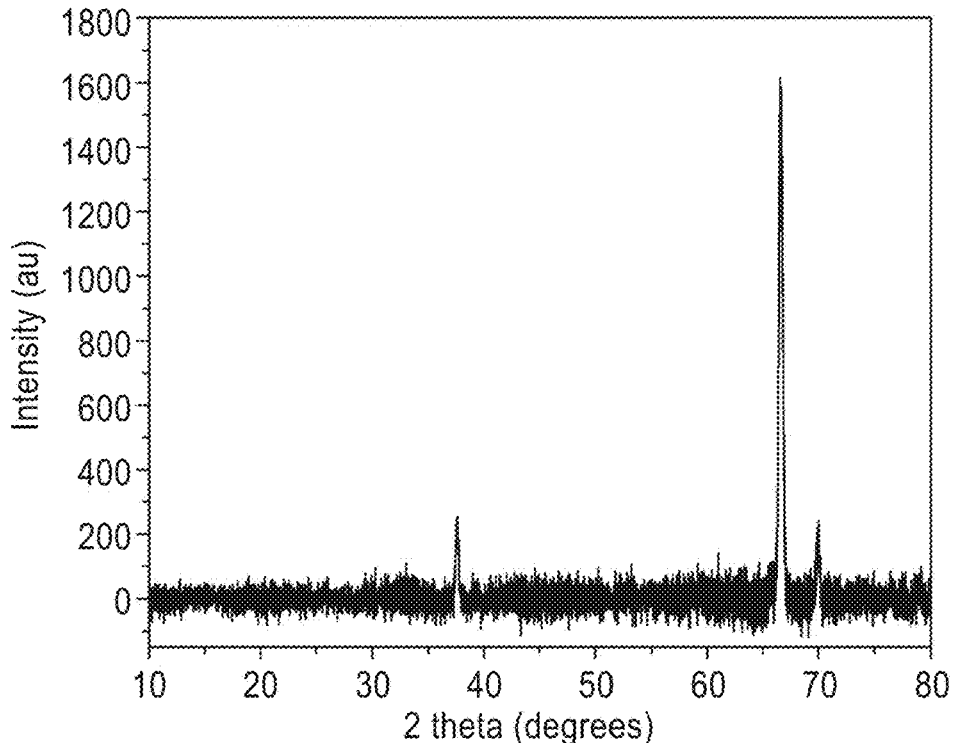

FIG. 4B: XRD of a 60 μm XABC LCO electrode oriented in the (110) direction.

Figure 4C:
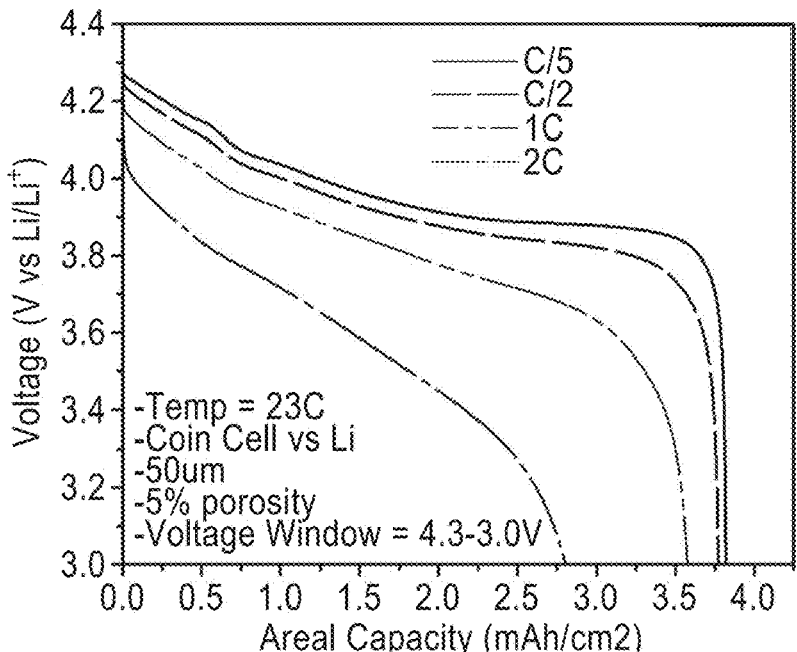

FIG. 4C: A galvanostatic trace of a 60 μm XABC LCO electrode oriented in the (110) direction at various rates of discharge.

Figure 4D:
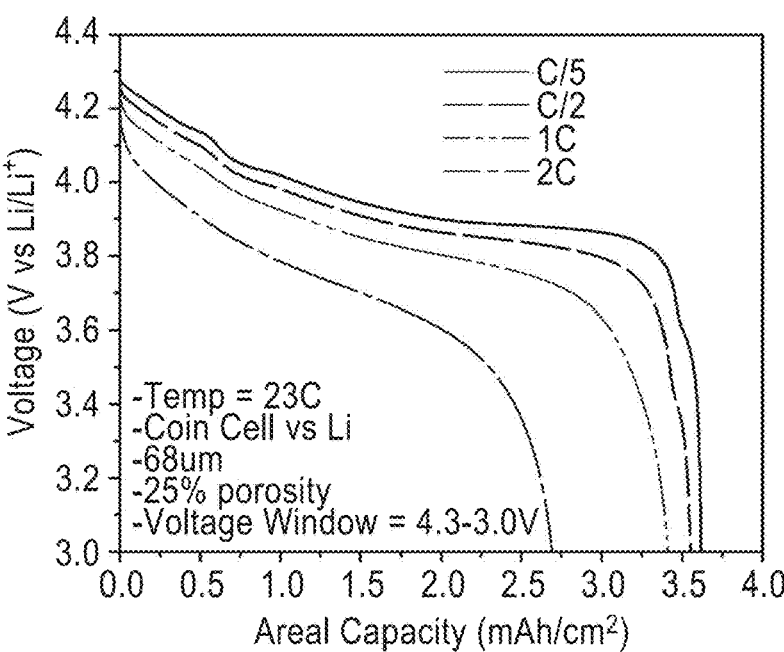

FIG. 4D: A galvanostatic trace of a commercial LCO electrode at various discharge rates.

Figure 4E:
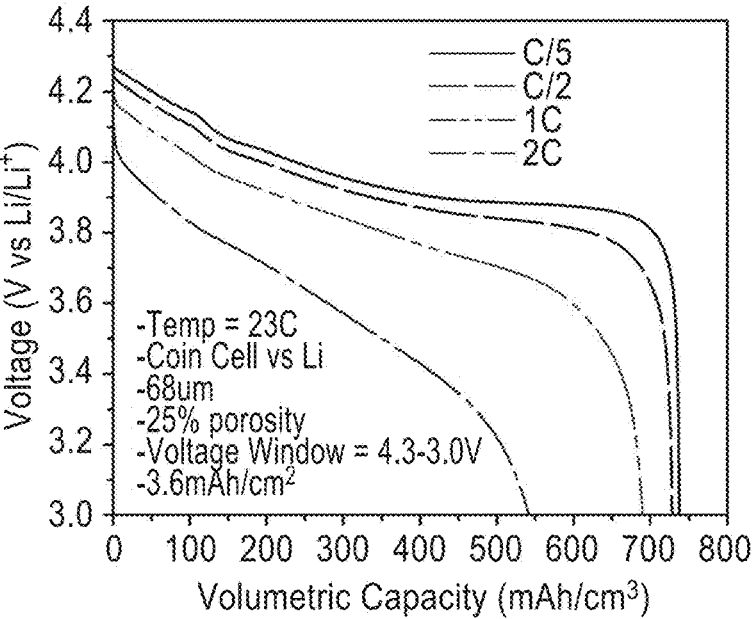

FIG. 4E: A galvanostatic trace of a XABC LCO electrode normalized by volume and run at various discharge rates.

Figure 4F:
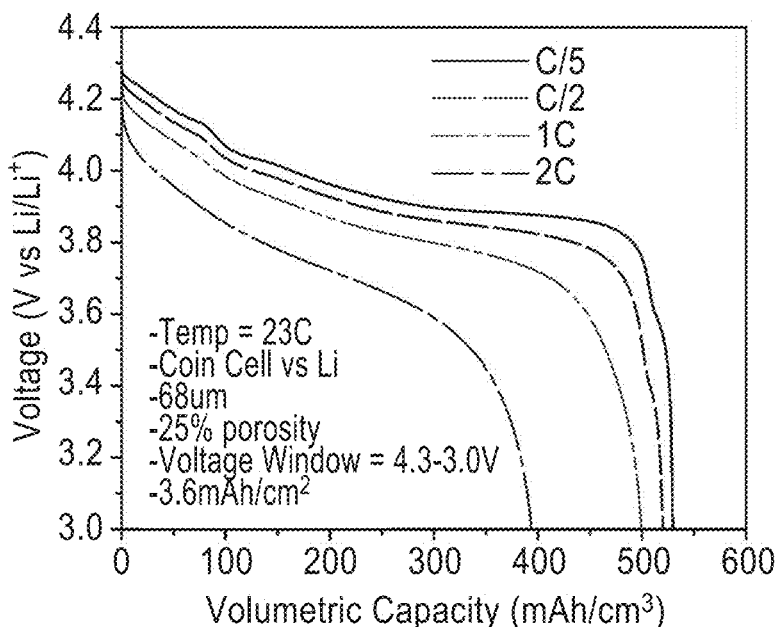

FIG. 4F: A galvanostatic trace of a commercial LCO electrode normalized by volume and run at various discharge rates.

Figure 5A:
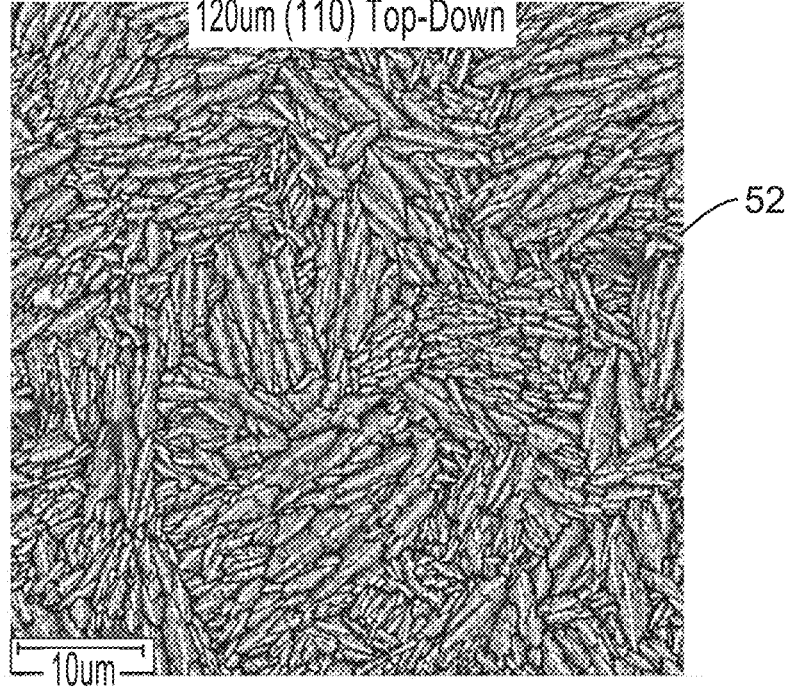

FIG. 5A: A top down SEM view of a 120 μm XABC LCO electrode that is oriented in the (110) direction.

Figure 5B:
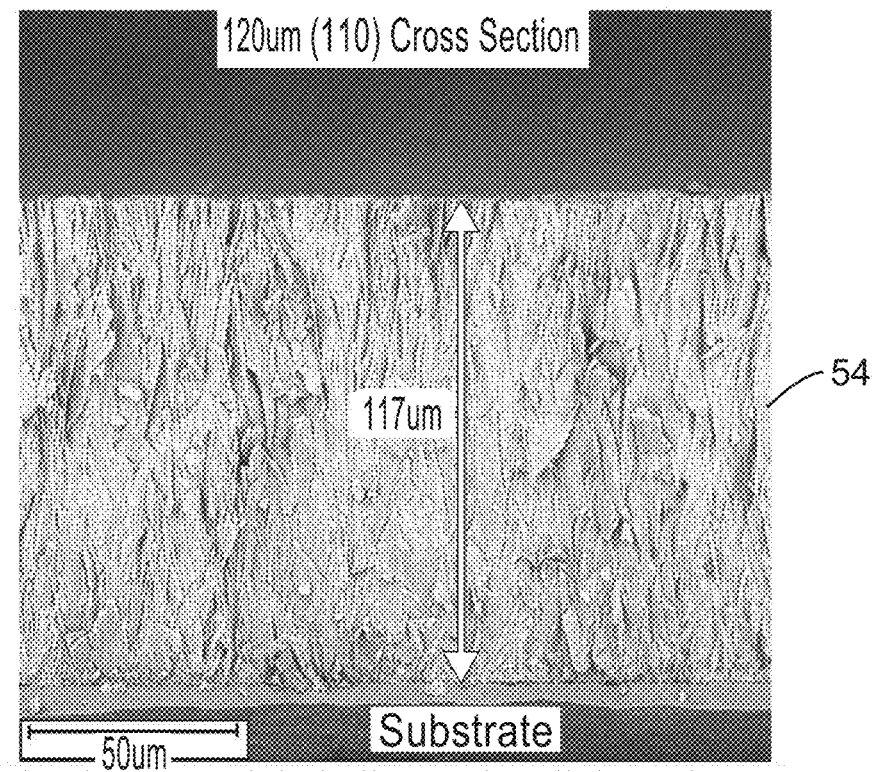

FIG. 5B: A cross-section SEM view of a 120 μm XABC LCO electrode that is oriented in the (110) direction.

Figure 5C:
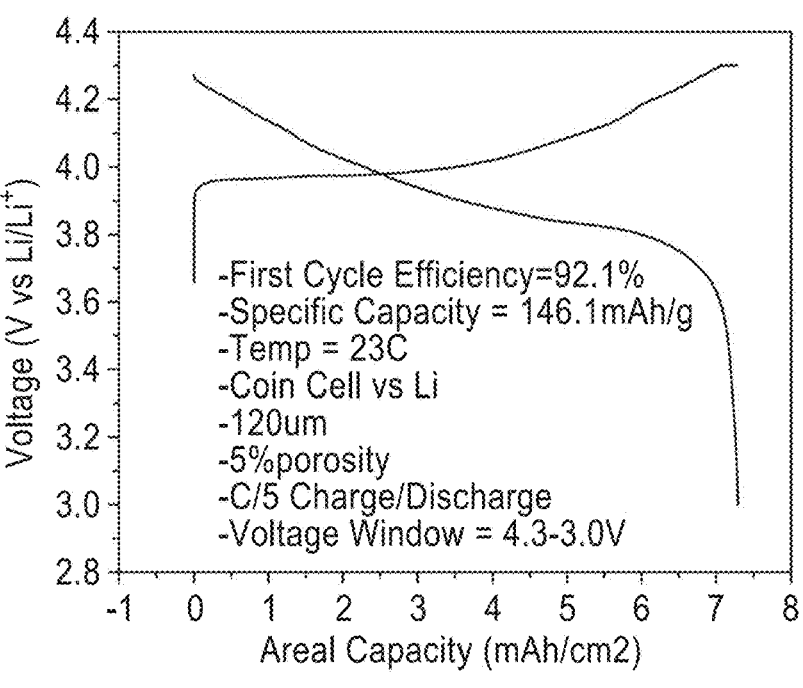

FIG. 5C: A galvanostatic trace of a 120 μm XABC LCO electrode oriented in the (110) direction.

Figure 5D:
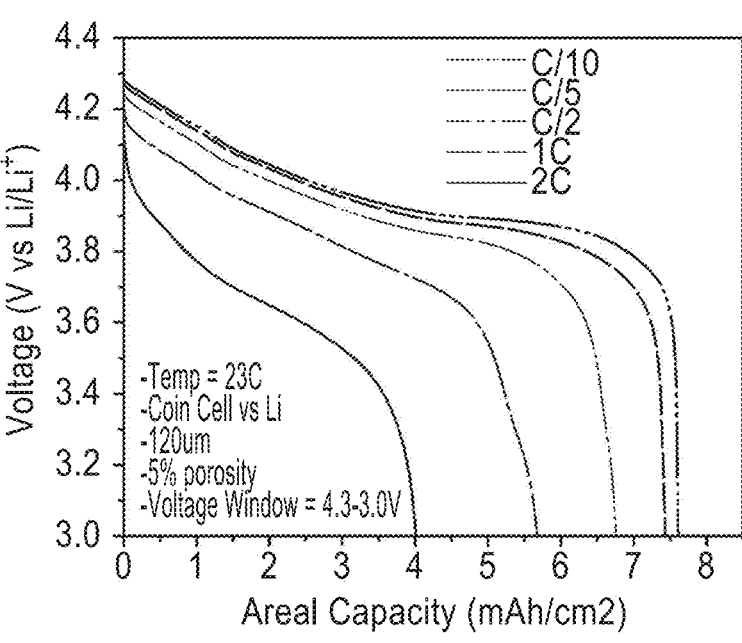

FIG. 5D: Rate capability of a 120 μm XABC electrode oriented in the (110) direction.

Figure 5E:
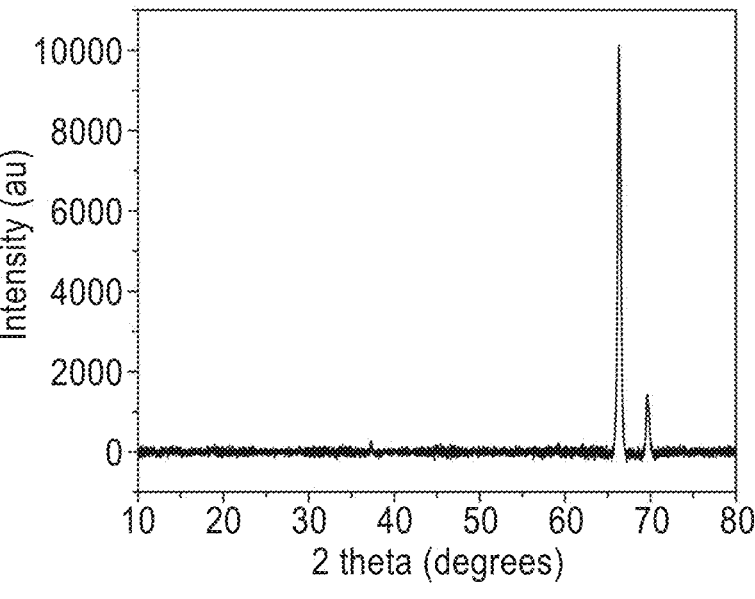

FIG. 5E: XRD of a 120 μm XABC LCO electrode that is oriented in the (110) direction.

Figure 6A:
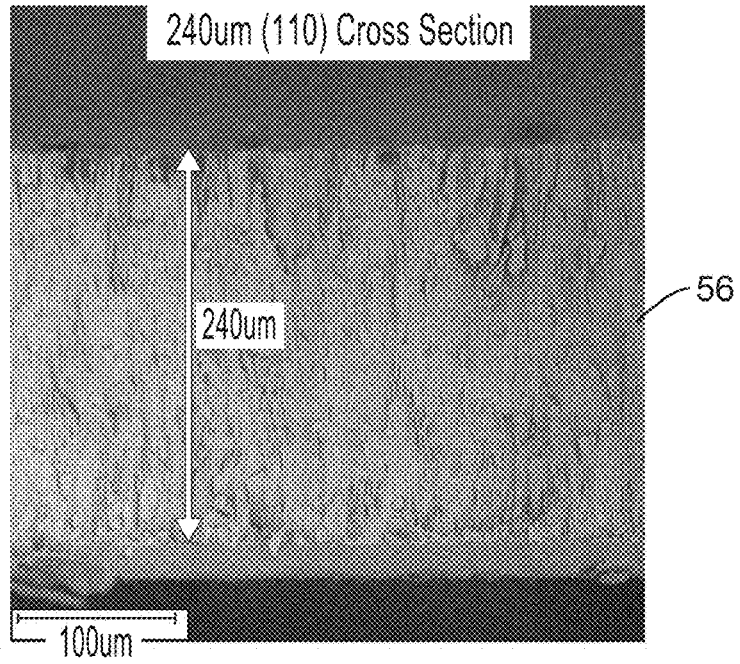

FIG. 6A: A cross-section SEM view of a 240 μm XABC LCO electrode that is oriented in the (110) direction.

Figure 6B:
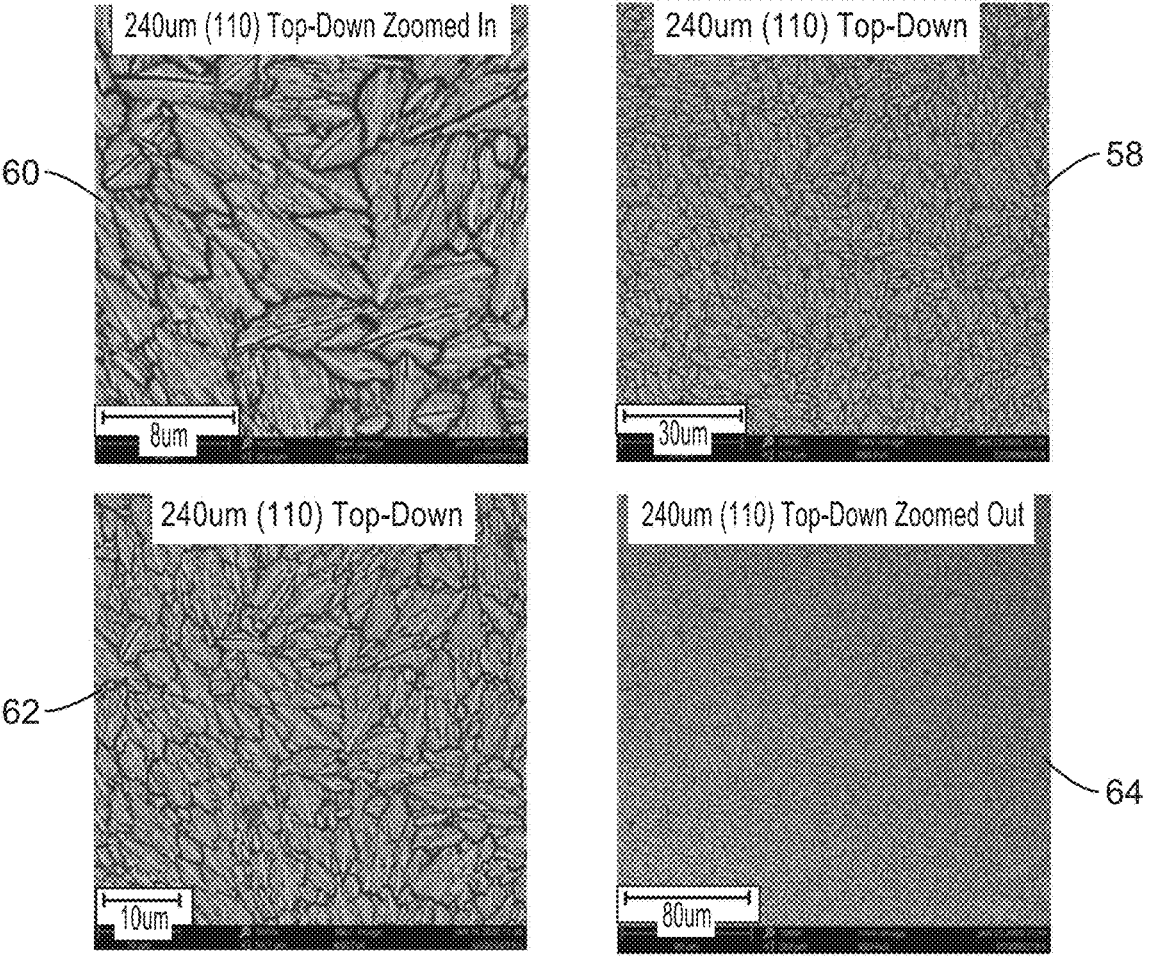

FIG. 6B: Top down SEM views of a 240 μm XABC LCO electrode that is oriented in the (110) direction.

Figure 6C:
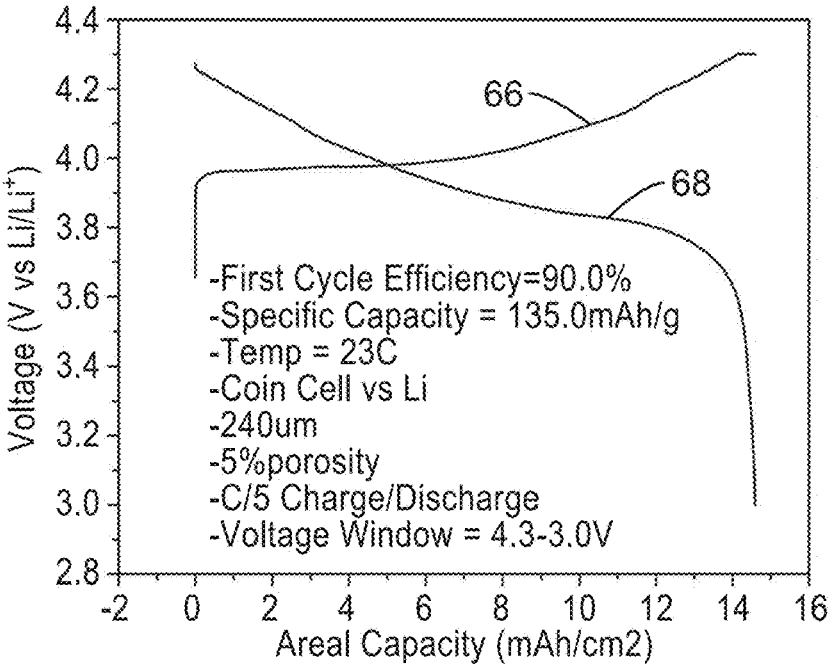

FIG. 6C: A galvanostatic trace of a 240 μm XABC LCO electrode oriented in the (110) direction.

Figure 6D:
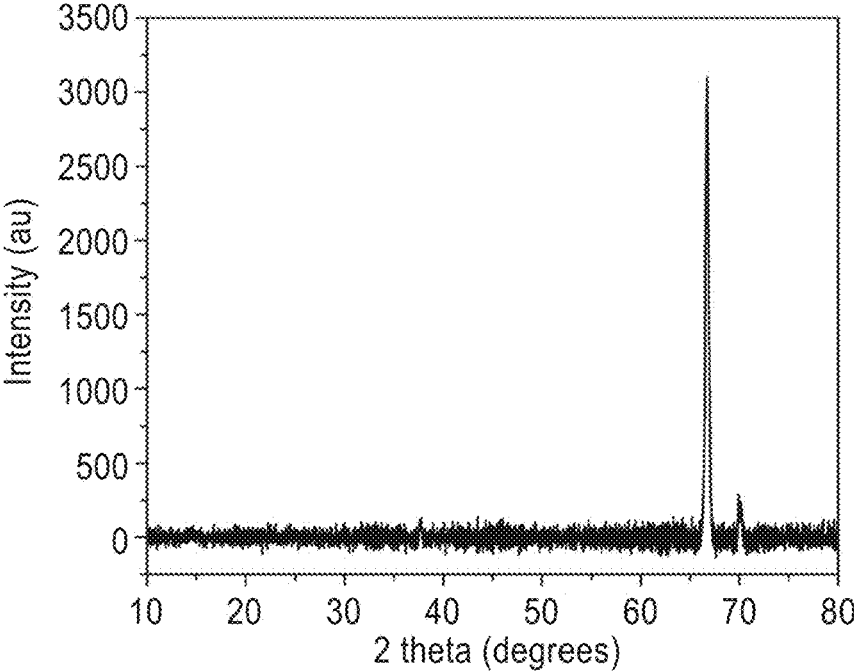

FIG. 6D: XRD of a 240 µm XABC LCO electrode that is oriented in the (110) direction.

Figure 7:
Figure 7:
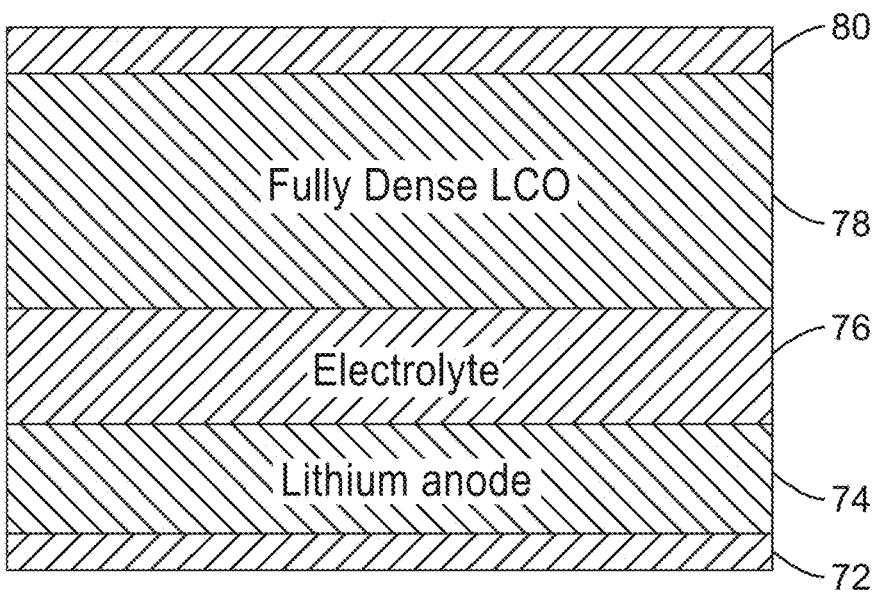

FIG. 7: Schematic of an embodiment of a solid-state battery according to the presented technology.

Figure 8A:
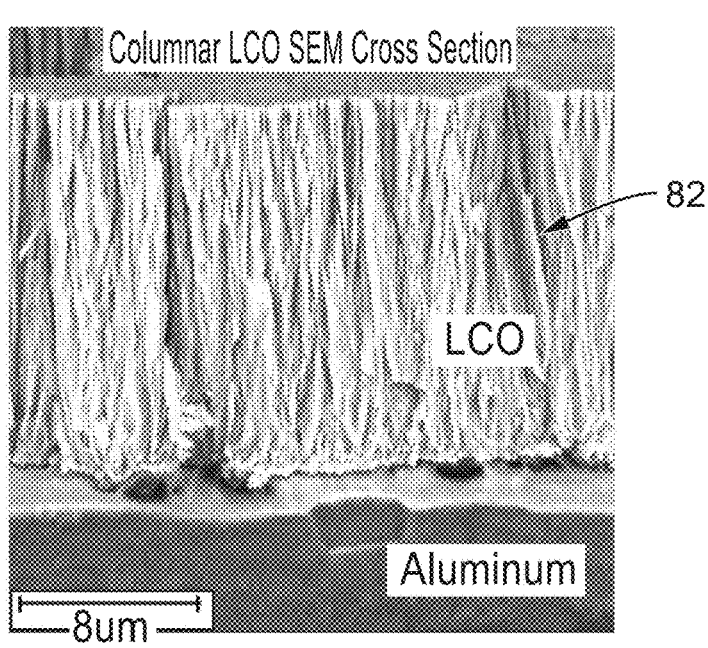

FIG. 8A: A cross section SEM of XABC LCO grown with columnar morphology having (110) morphology.

Figure 8B:
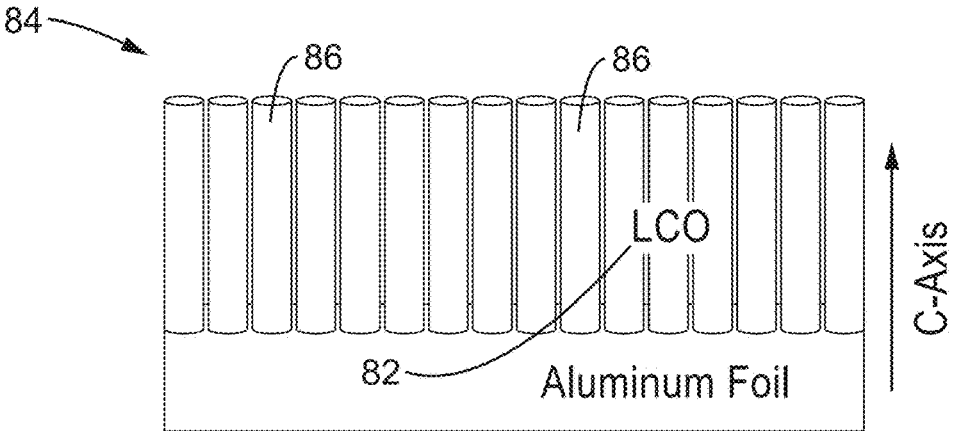

FIG. 8B: Schematic of columnar morphology.

Figure 8C:
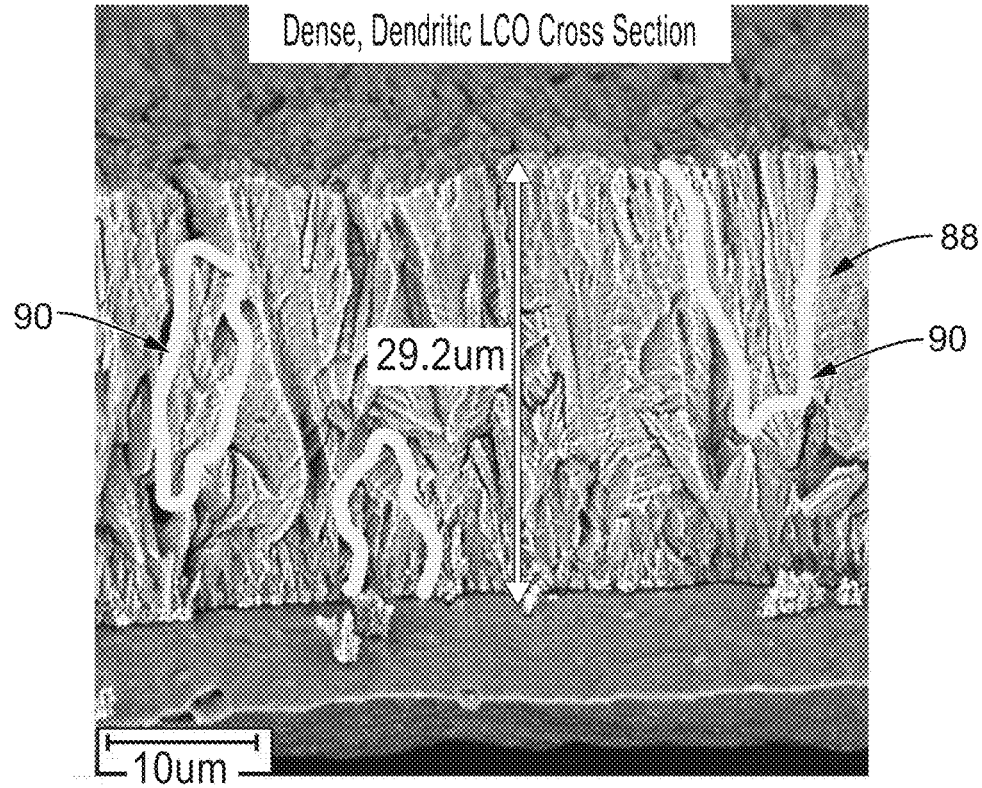

FIG. 8C: A cross section SEM of XABC LCO with dense dendritic morphology having (110) morphology.

Figure 8D:
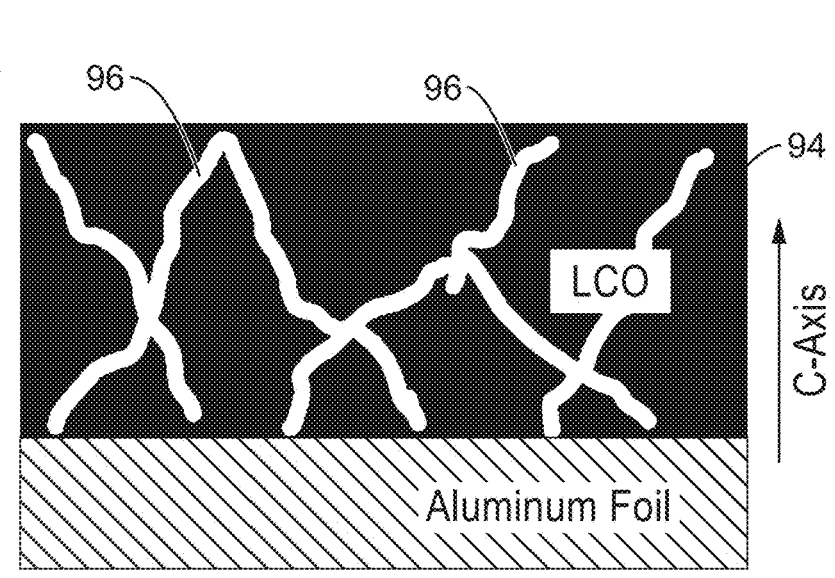

FIG. 8D: Schematic of LCO with non-columnar grain boundaries.

Figure 9A:
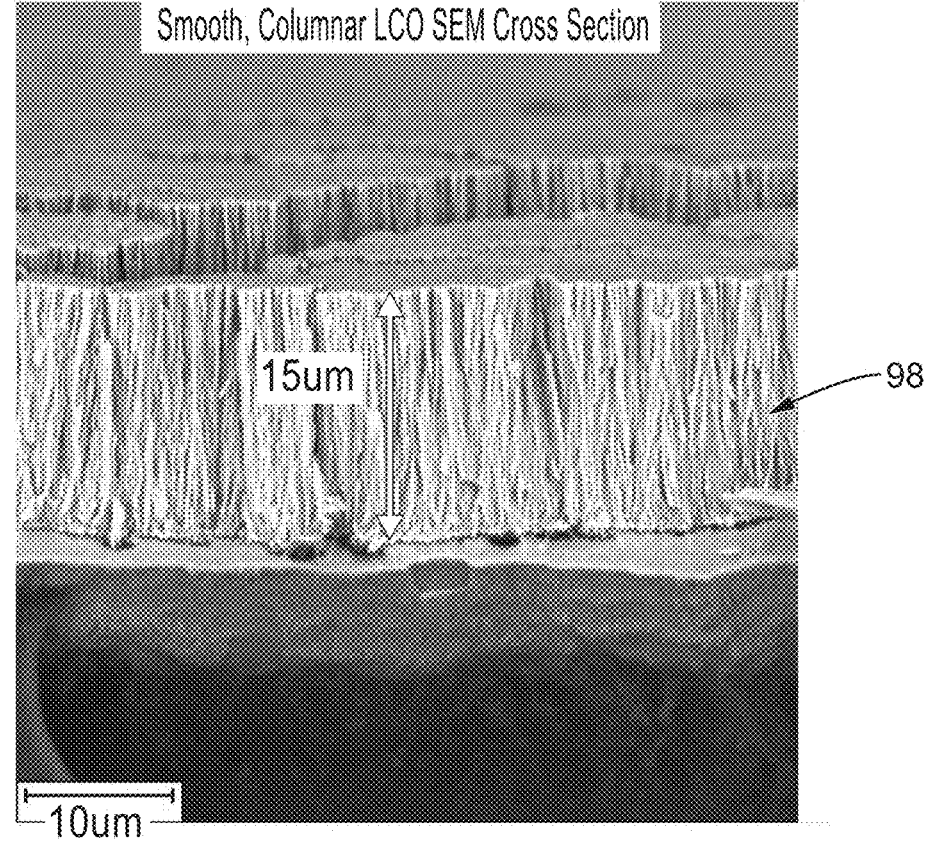

FIG. 9A: Cross section SEM of XABC LCO grown with low surface roughness.

Figure 9B:
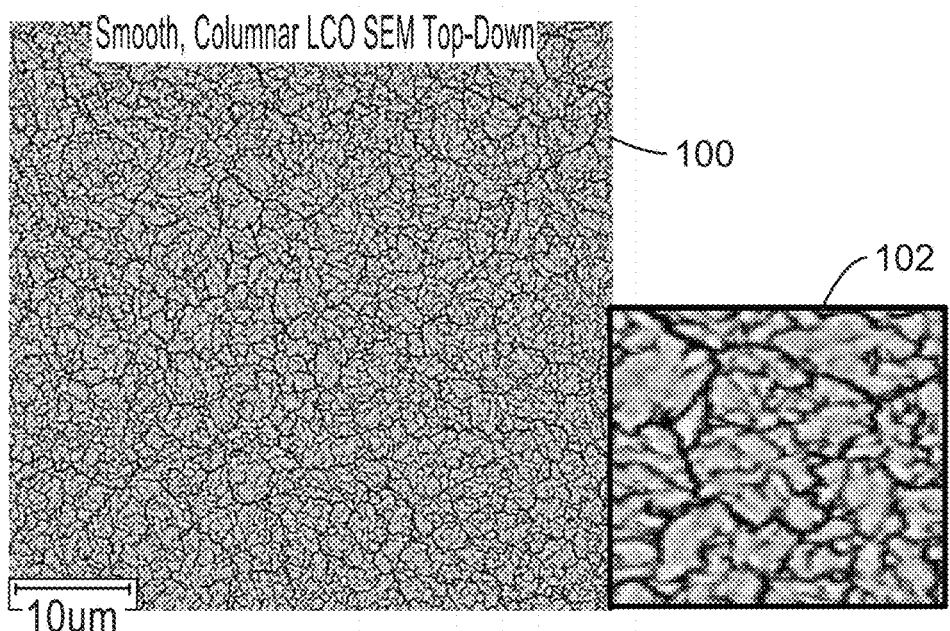

FIG. 9B: Top surface SEM of XABC LCO grown with low surface roughness.

Figure 9C:
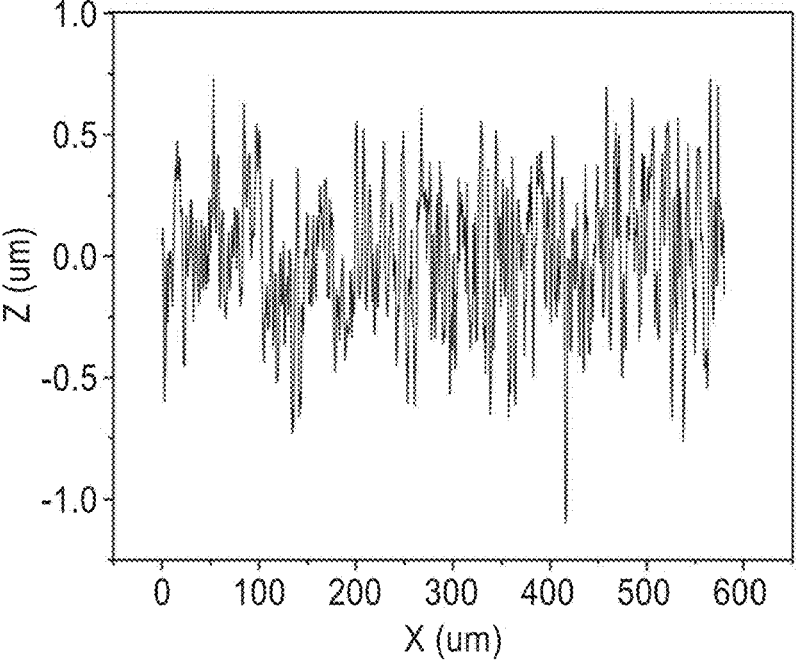

FIG. 9C: Optical profilometry measurement of XABC LCO grown with low surface roughness.

Figure 10A:
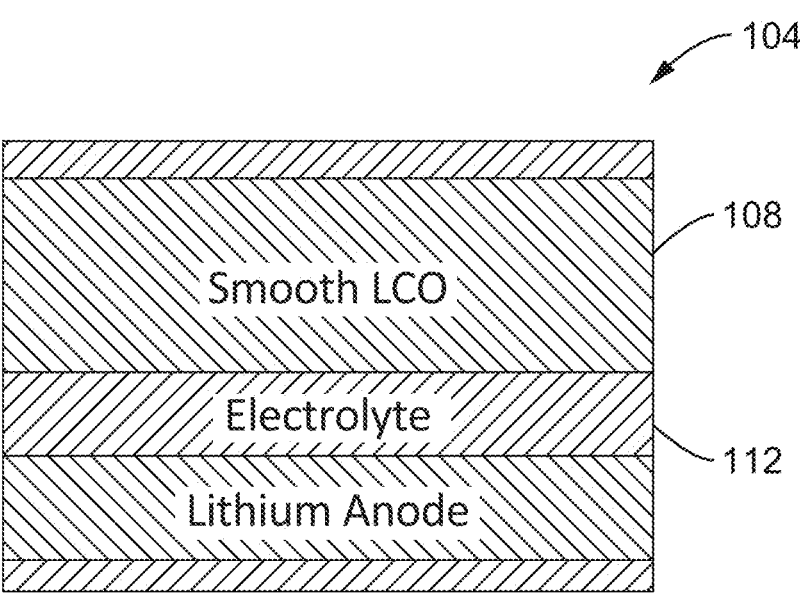
Figure 10B:
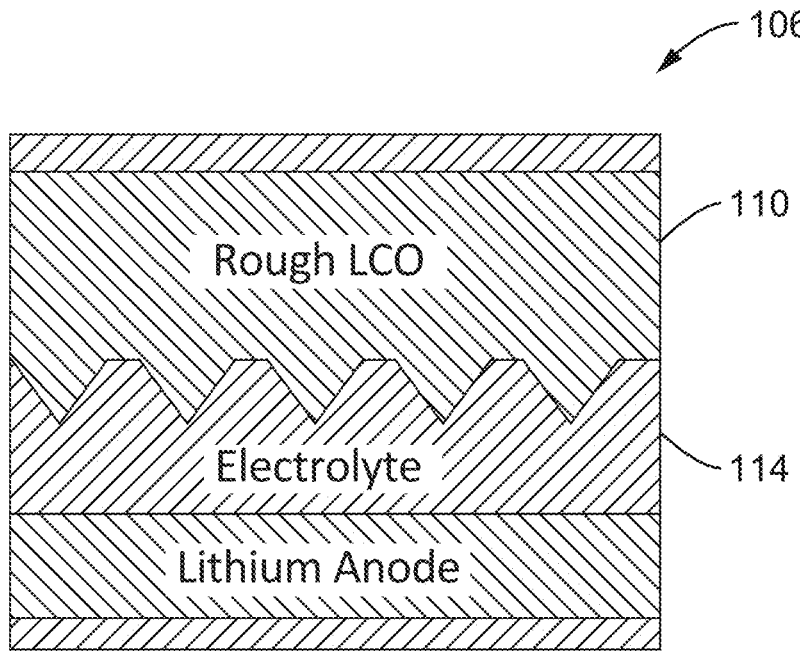

FIG. 10A and FIG. 10B: Schematic diagrams showing the effect of surface roughness on solid-state electrolyte separating layer thickness.

Figure 11:
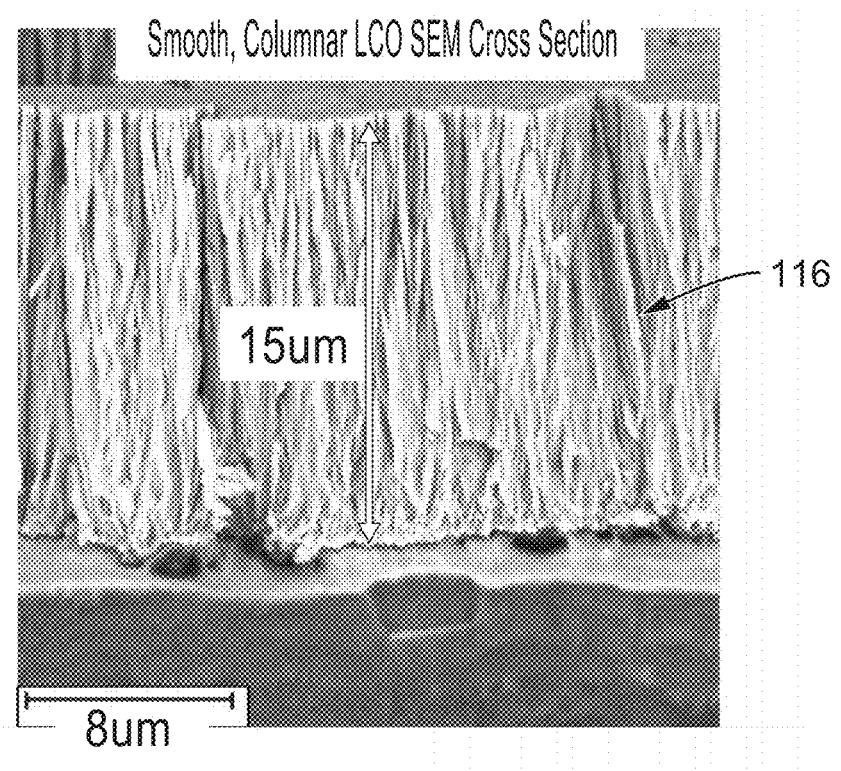

FIG. 11: SEM of columnar XABC LCO illustrating the void distribution is partitioned as striations between the columns.

Figure 12A:
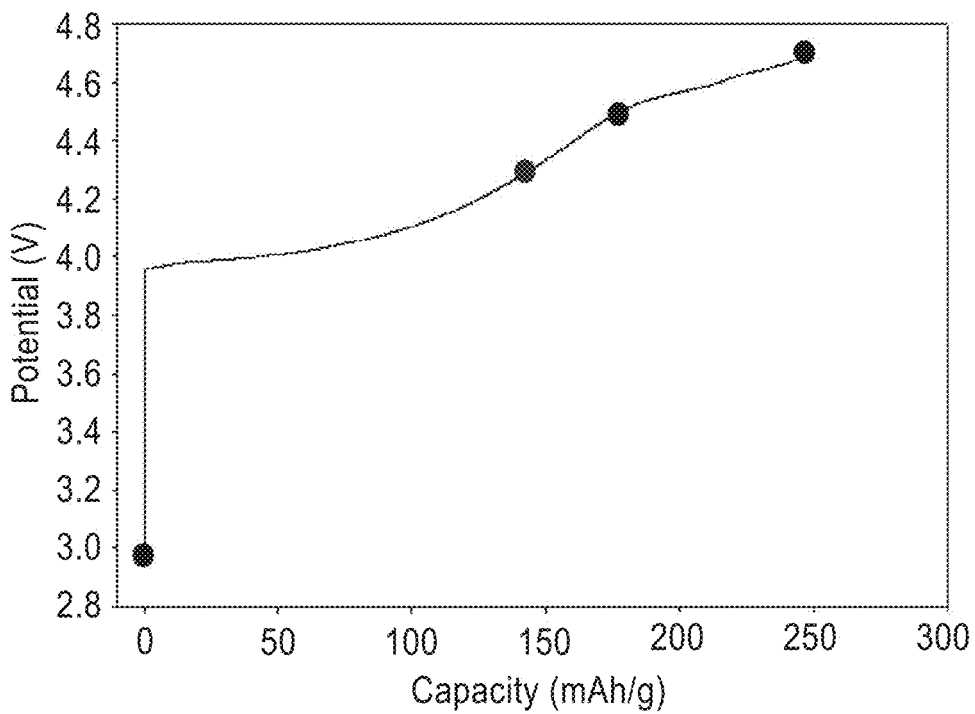

FIG. 12A: Voltage vs. capacity of commercial LCO stopped at different potentials for XRD analysis at those various potentials.

Figure 12B:
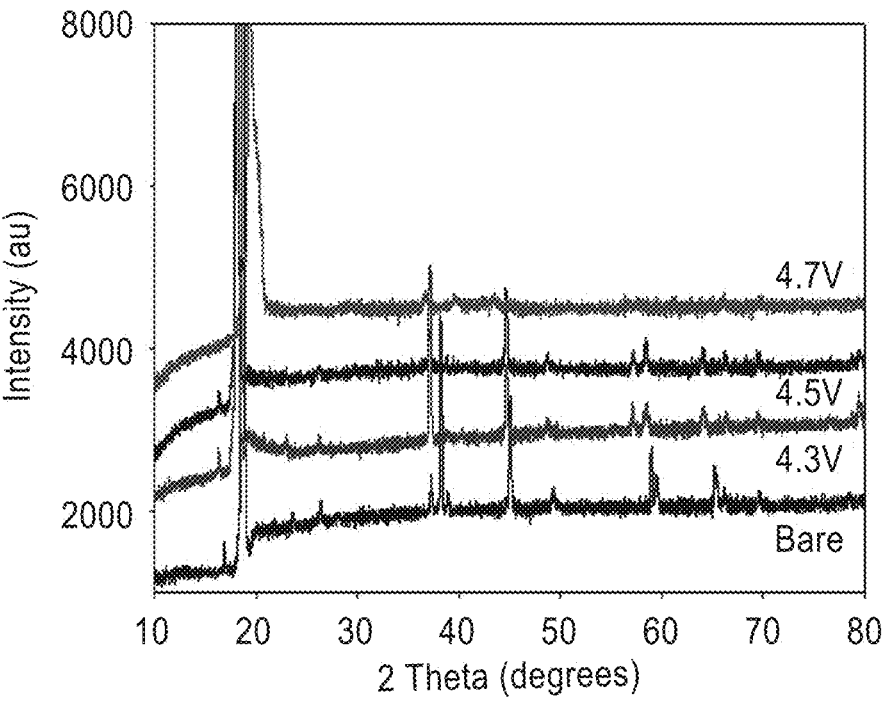

FIG. 12B: XRD of commercial LCO at different cut-off potentials.

Figure 13A:
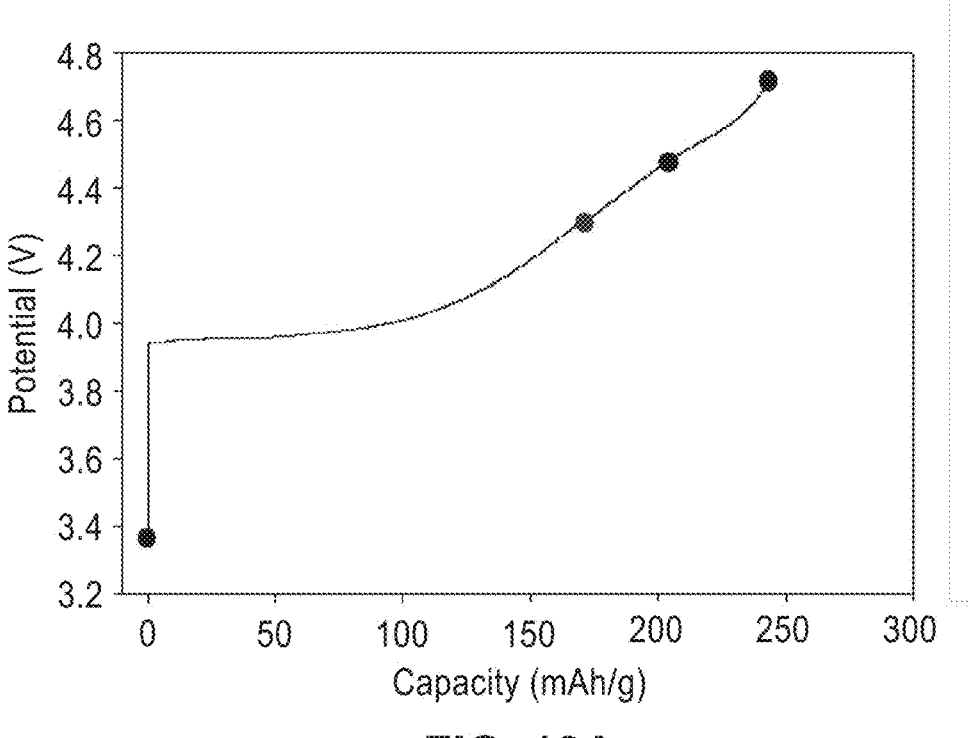

FIG. 13A: Voltage vs. capacity of XABC (110) LCO stopped at different potentials denoted by circles for XRD analysis at those various potentials.

Figure 13B:
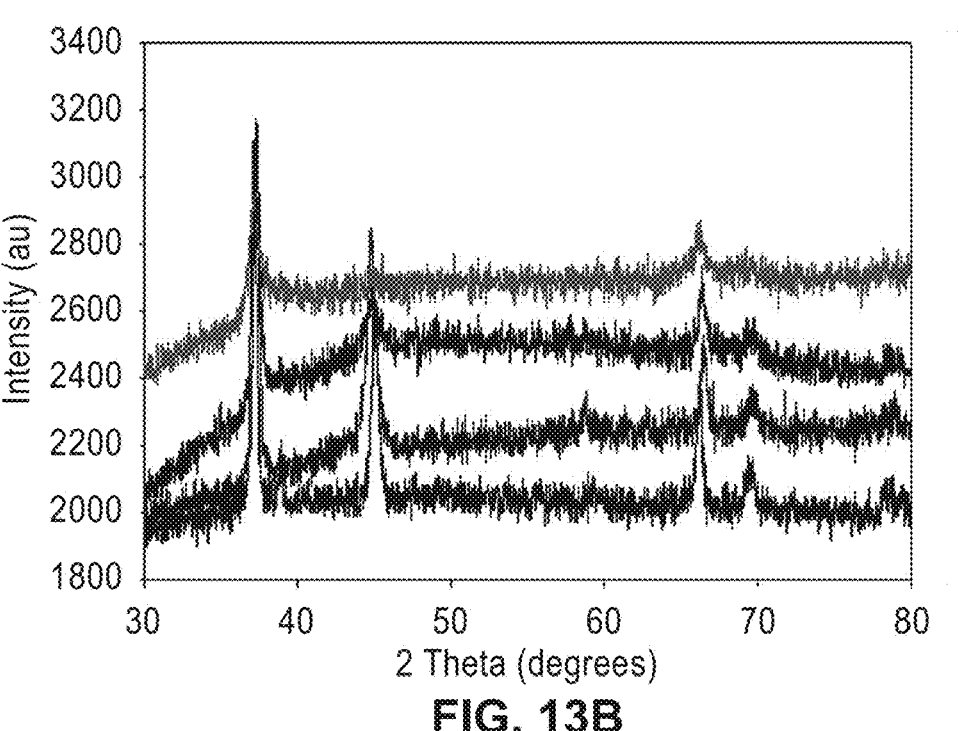

FIG. 13B: XRD evolution of Xerion LCO at different cut-off potentials.

Figure 14A:
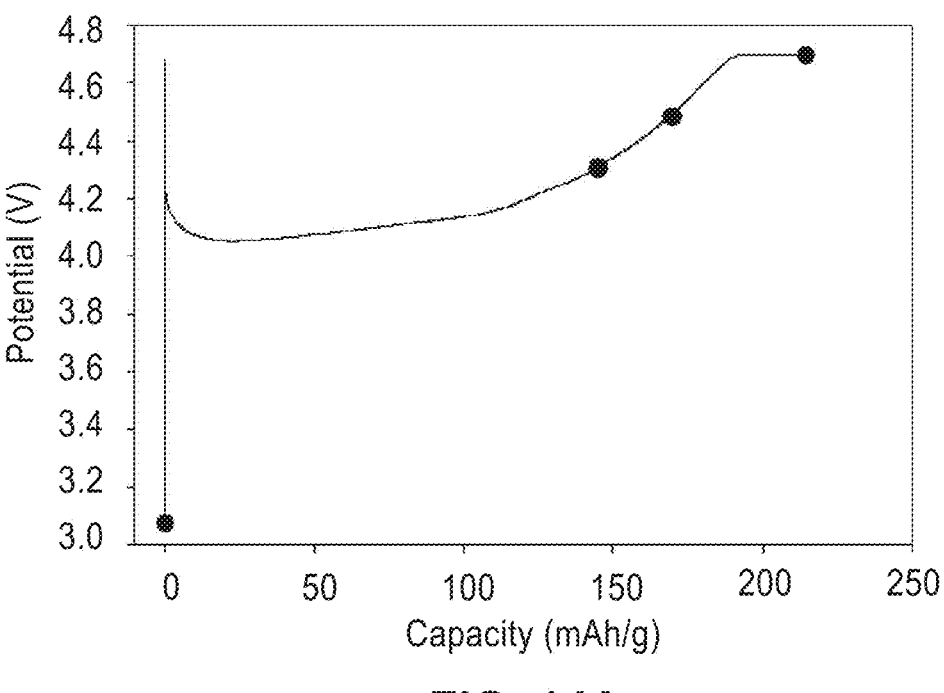

FIG. 14A: Voltage vs. capacity of XABC (003) LCO stopped at different potentials denoted by circles.

Figure 14B:
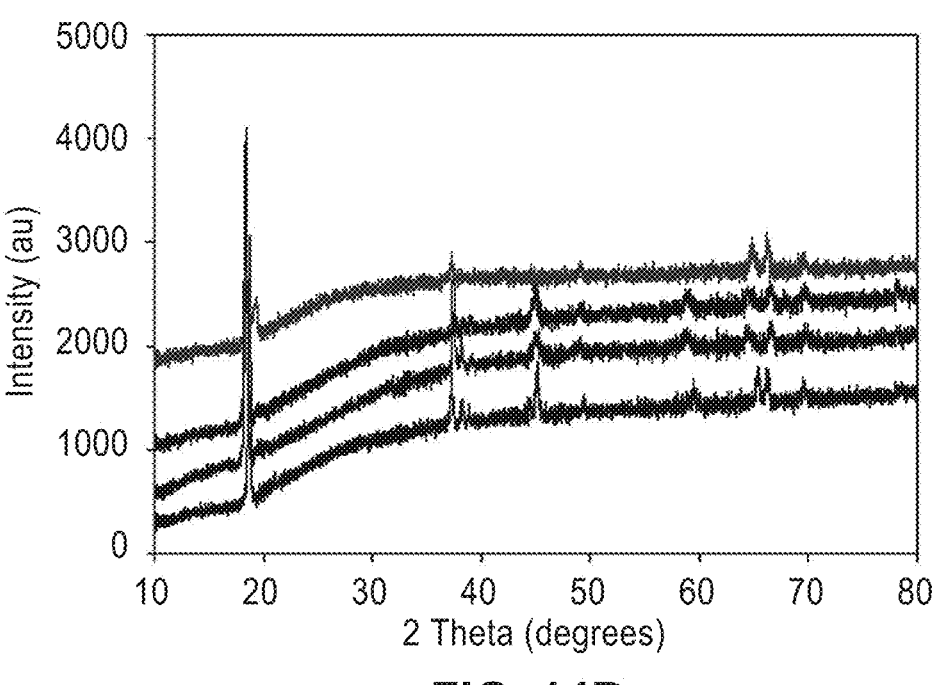

FIG. 14B: XRD evolution of Xerion LCO at different cut-off potentials.

Figure 15A:
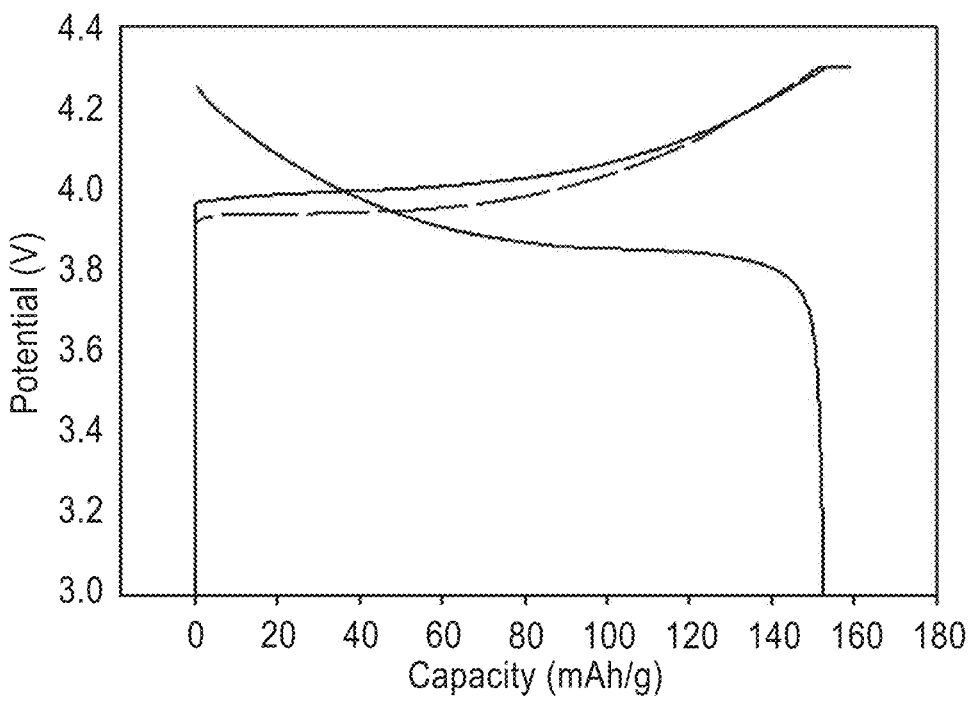

FIG. 15A: Galvanostatic trace of a commercial LCO electrode that was used to precycle the electrode for thermal testing.

Figure 15B:
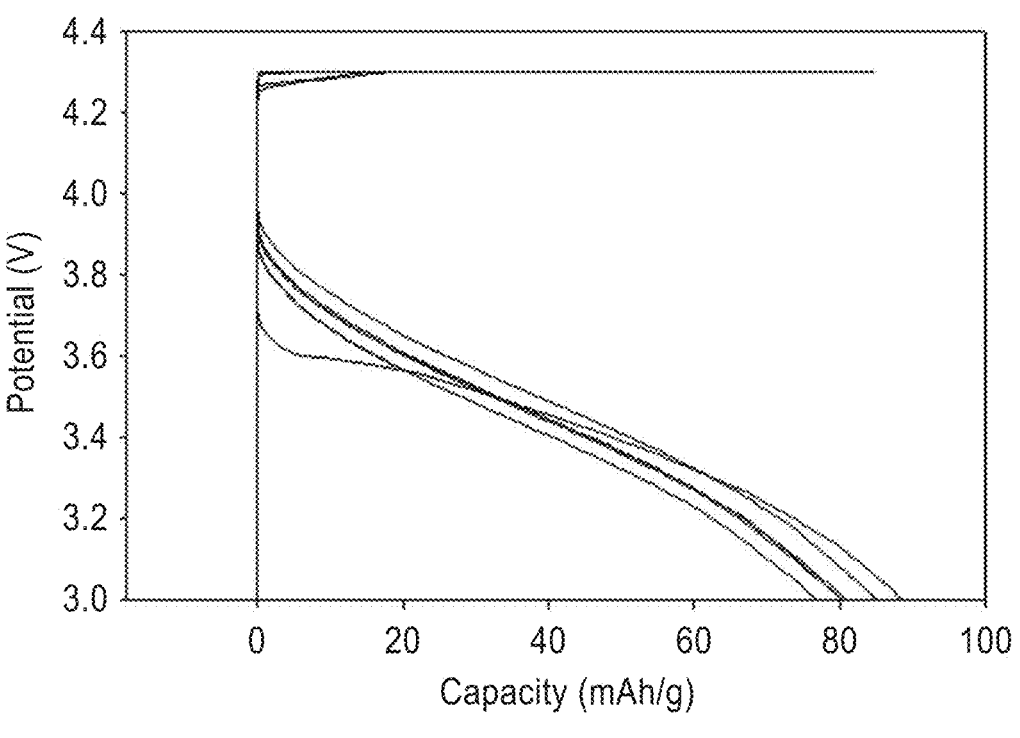

FIG. 15B: Galvanostatic traces of a commercial LCO electrode in the presence on liquid electrolyte after a heat treatment at 215° C. for 10 minutes at 4.3V Li/Li⁺.

Figure 16A:
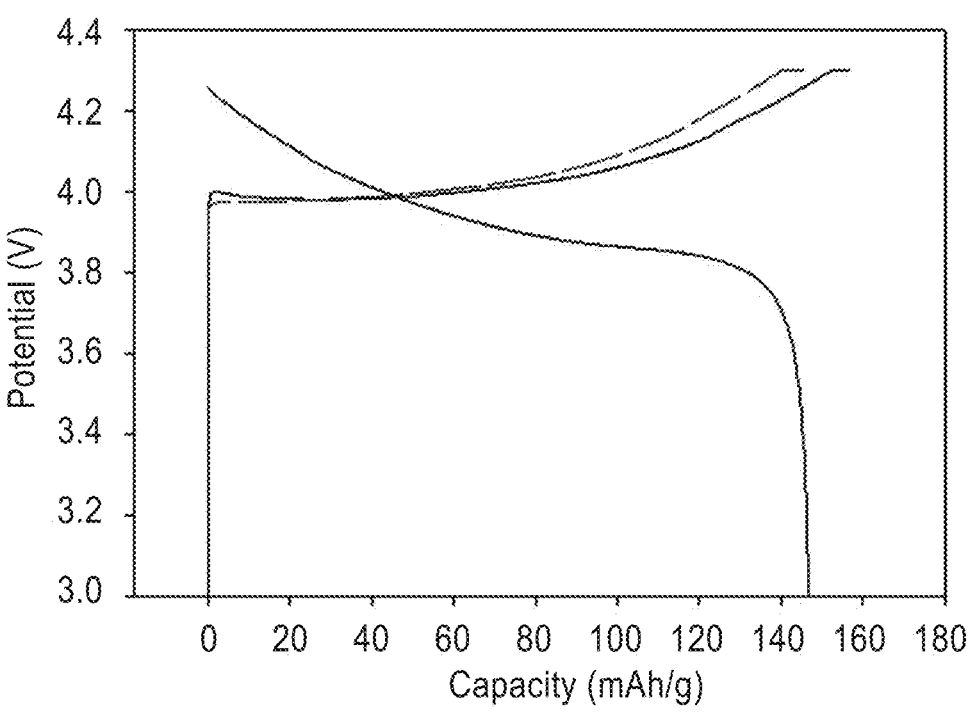

FIG. 16A: A galvanostatic trace of a XABC LCO electrode, oriented in the (003) direction, that was used to precycle the electrode for thermal testing.

Figure 16B:
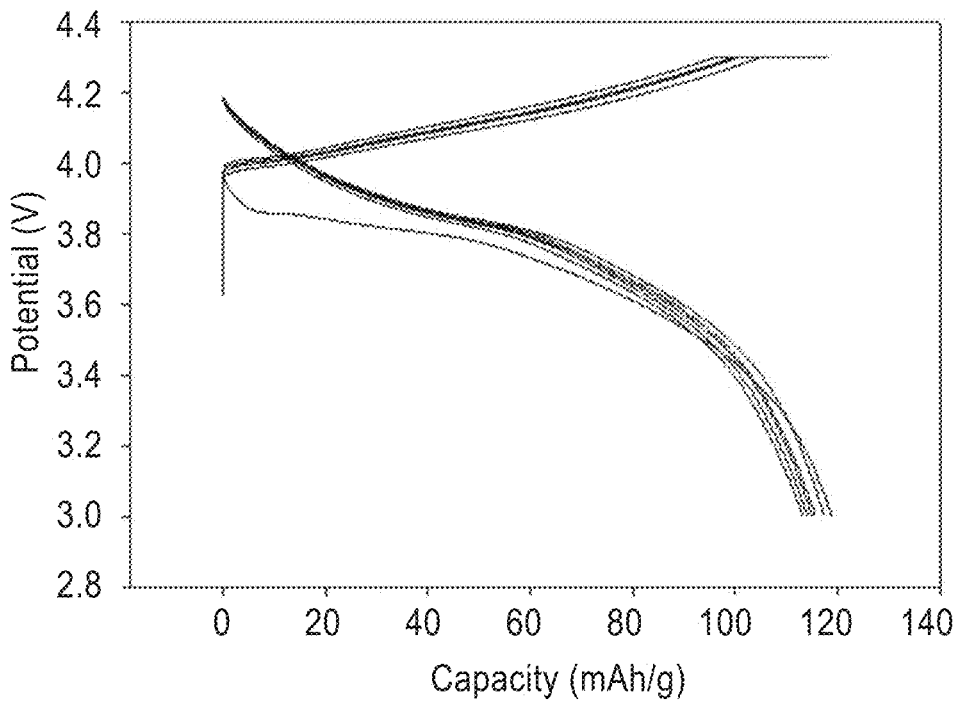

FIG. 16B: Galvanostatic traces of a XABC LCO electrode, oriented in the (003) direction, in the presence of liquid electrolyte, after a heat treatment at 215° C. for 10 minutes at 4.3V Li/Li⁺.

Figure 17A:
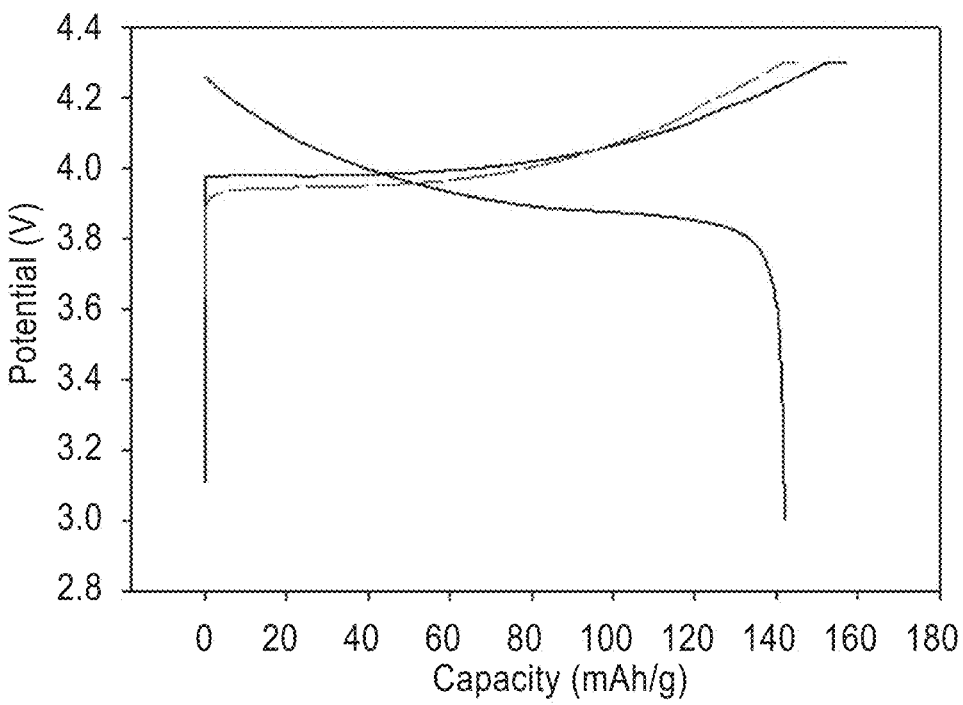

FIG. 17A: A galvanostatic trace of a XABC LCO electrode, oriented in the (110) direction, that was used to precycle the electrode for thermal testing.

Figure 17B:
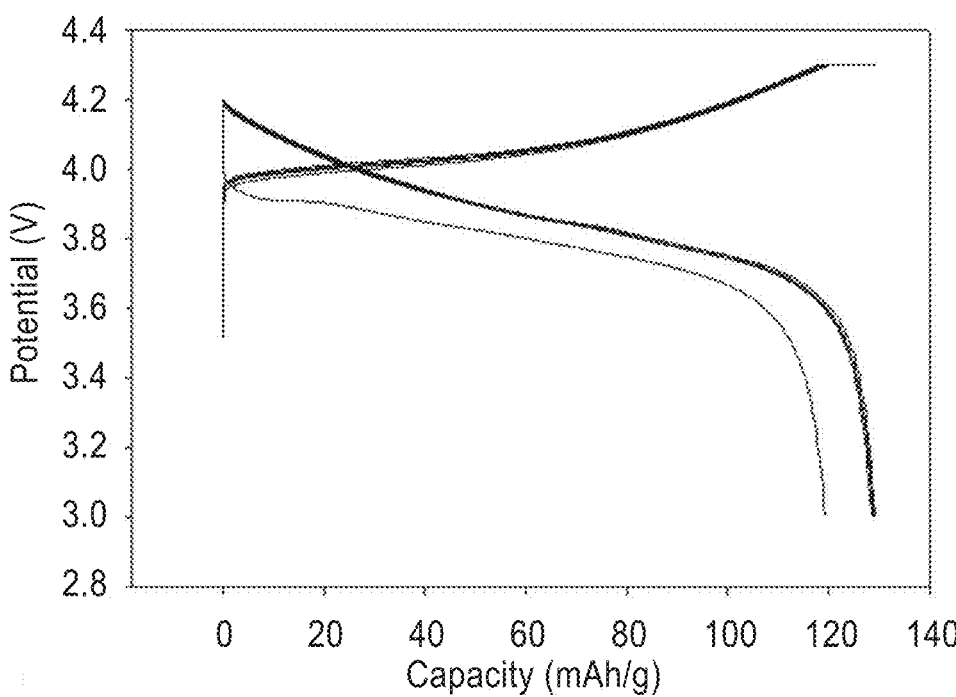

FIG. 17B: Galvanostatic traces of a XABC LCO electrode, oriented in the (110) direction, in the presence of liquid electrolyte, after a heat treatment at 215° C. for 10 minutes at 4.3V Li/Li⁺.

Figure 18:
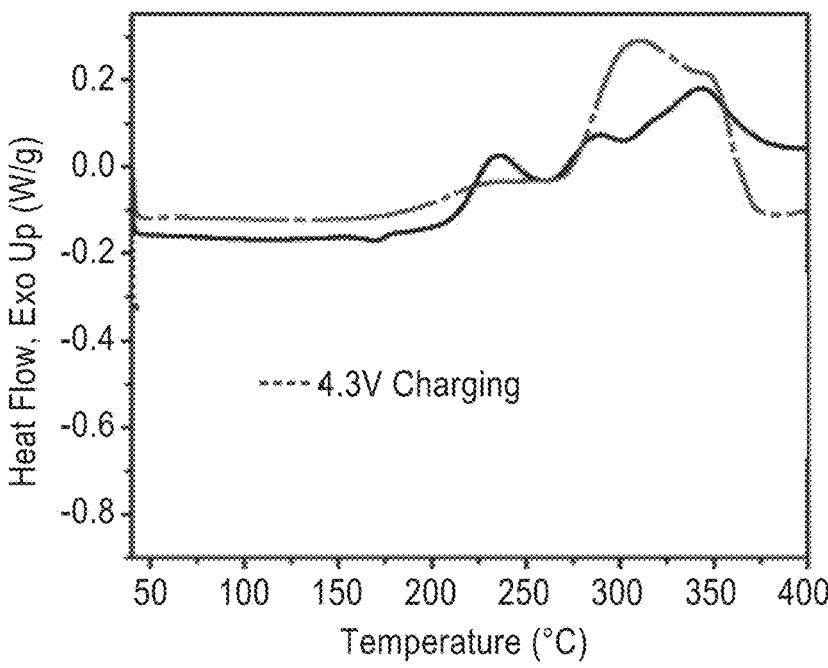

FIG. 18: A DCS graph of both XABC and commercial electrodes.

Figure 19A:
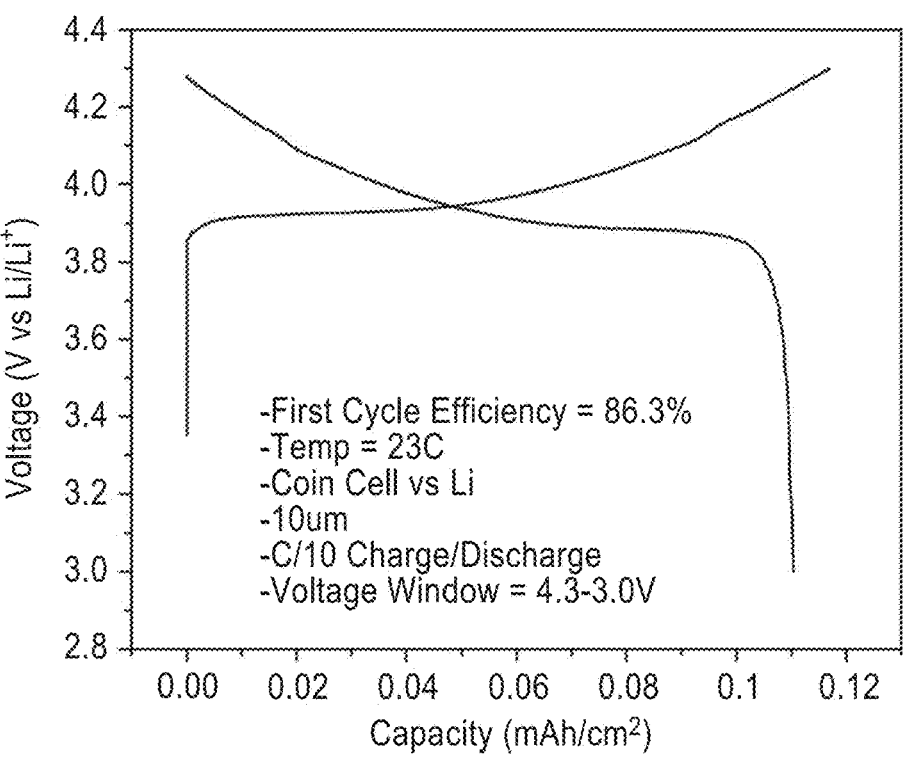

FIG. 19A: Galvanostatic trace of a solid state battery with the following configuration: XABC LCO∥TEGDME polymer electrolyte∥Lithium.

Figure 19B:
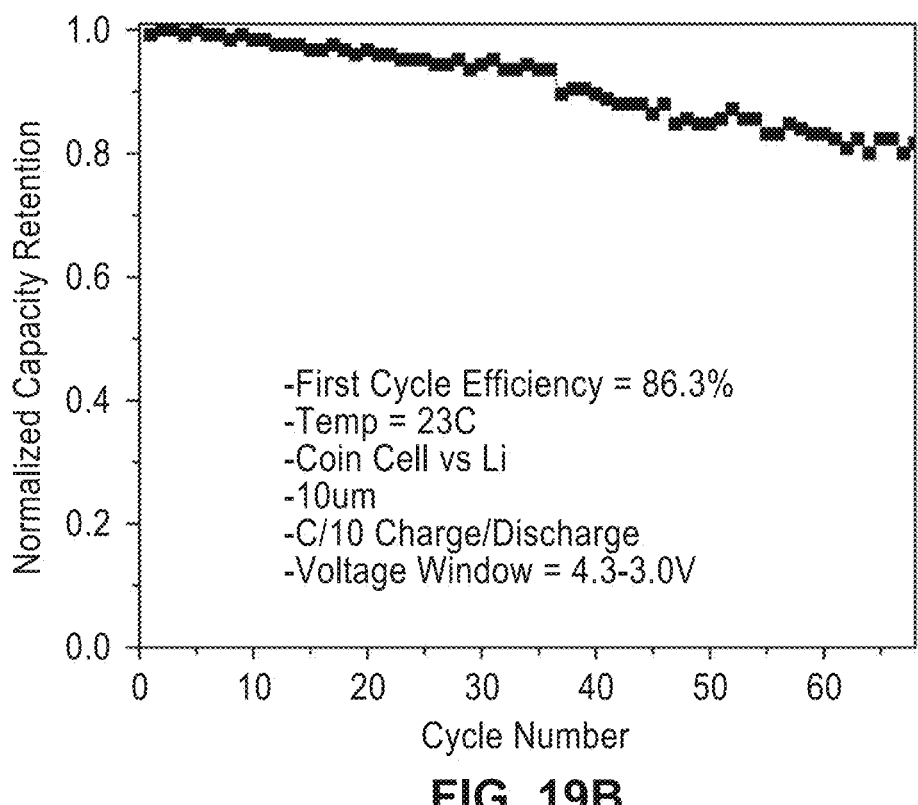

FIG. 19B: Cycle life stability graph of a solid state battery with the following configuration: XABC LCO∥TEGDME polymer electrolyte∥Lithium.

Figure 20:
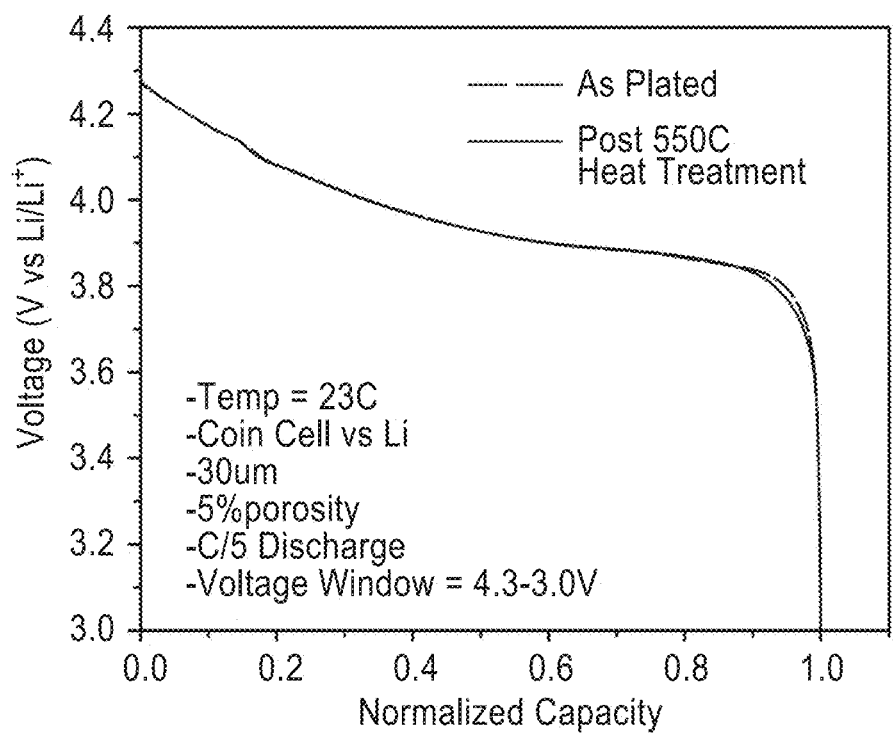

FIG. 20: A galvanostatic trace of a XABC LCO with and without heat treatments.

DETAILED DESCRIPTION

1. Definitions

As used herein, the term "high density" or "fully dense" shall mean and include a density of about 99% to about 100%.

As used herein in relation to describing a surface, the term "smooth" refers to a Mean Roughness Depth (Rz) that is preferably below about 10 µm, more preferably below about 5 µm, and even more preferably below about 2 µm. It will be appreciated that Rz is the arithmetic mean value of the single roughness depths of consecutive sampling lengths, and is typically calculated by measuring the vertical distance from the highest peak to the lowest valley over five sampling lengths, and then averaging these distances.

2. Description

The technology described in this disclosure is an extension of the DirectPlate™ LCO technology developed by Xerion Advanced Battery Corp. (XABC) into the realm of electrodes generally and more particularly to electrodes for liquid and solid-state electrolyte batteries. DirectPlate™ LCO is fully described in XABC's U.S. Pat. No. 9,780,356 which is incorporated herein by reference in its entirety. As shorthand only, the terms "XABC method", "XABC process", "XABC LCO", and "XABC LCO electrode" are used in this disclosure to distinguish the technology described in this disclosure from XABC's DirectPlate™ LCO technology.

A major issue with batteries that utilize thick and dense electrodes is high ion and electron resistance through the electrode leading to diminished charging and discharging rates along with burdensome heat generation. The XABC method described herein is a process that produces an electrode structure that solves that problem. XABC LCO electrodes can be used in their thick form for solid-state or liquid electrolyte batteries. Electrodes formed by the XABC process can be grown much thicker (e.g., from about 10 µm to about 400+ µm) than competing technology (e.g., RF-sputtering, PLD, and CVD). With this in mind, the properties that enable this impressive thickness is the unique structure that the electrode comprises. As a result, this structural property significantly increase the ion and electron conductivity thereby enabling these thick electrodes. These properties comprise one or more of the following:

1. Controlled crystal orientation (preferred orientation is in the (110) crystallographic direction);
2. High density (i.e., the material is fully dense);
3. The electrode is thick (e.g., from about 10 µm to about 200 µm or greater), but can also be thin or thick (e.g., from less than about 1 µm to about 200 µm or greater);
4. At least one surface is a smooth surface;
5. Continuous grains between the surface and the current collector thereby creating conductive pathways throughout the material.

The first property applies to all preferred embodiments. More preferably the first three properties are present. The fourth and fifth properties do not need to be present with liquid electrolyte batteries, but are desirable. In the case of solid-state electrolyte batteries, the fourth and fifth are preferably present as well.

In the most preferred embodiment, all five properties are present. The combination of these five properties creates a new electrode structure with a concrete and quantitative definition using the measured materials properties. This combination provides improved performance of both solid-state and liquid electrolyte-based batteries. To that end, this is not an incremental improvement to existing technology, but is a transformative leap from current state-of-the-art technology, which enables products that do not exist because of the limitations with current Li-ion batteries. Some of these new applications are: human (newborn-adult) external/internal worn medical devices, long range electric vehicles, flight based taxies, uniquely thin consumer electronics and so forth.

Competing technologies are not capable of producing a combination of the five properties described above. Accordingly, the useful thickness of competing electrodes is limited. Furthermore, the methods required to produce some of those properties typically come at the expense of manufacturing speed (an order magnitude longer than the XABC method compared to pulsed laser deposition and sputtering). As stated previously, the XABC process described in this disclosure is an extension of the molten salt process described in XABC's DirectPlate™ LCO technology.

The crystallographic orientation of XABC LCO can be controlled along certain crystal axes to allow for fast lithium ion diffusion. Oriented LCO has been synthesized using techniques such as RF-magnetron sputtering, pulsed laser deposition, and chemical vapor deposition (this list is not meant to be exhaustive), but those methods are not considered cost effective for large scale manufacturing of commodity Li-ion batteries. For example, the RF-magnetron sputtering growth rate is about 0.1 μm/min, which effectively limits the thickness of the electrodes produced by that technique compared to the process which is described herein, which operates at a rate of about 1 μm/min to about 10 μm/min. Furthermore, RF-magnetron sputtering typically requires an additional post-heat treatment step because the material is not highly crystalline. That additional step is not required by the technology described in this disclosure, thereby further increasing the manufacturing speed and lowering the cost.

The XABC method described herein accomplishes orientation by controlling specifically known processing parameters, in a manner that is scalable unlike previous methods.

Example of XABC Method

A mixture of 0.75 g LiOH and 8 g KOH was ground and placed into a nickel crucible. After heating to 350° C., about 0.5 g CoO was added to the melt. The melt color changed from white to blue as the divalent cobalt ion was coordinated by hydroxide ions. After the added CoO was totally dissolved, aluminum foil was inserted into the bath for $LiCoO_2$ deposition. The electrochemical plating was tailored to achieve the different crystallographic orientations. The (003) oriented $LiCoO_2$ was prepared by applying a low constant current density of 1 mA/cm$^2$ between the working and the counter electrode. An electrode with an areal capacity of 4 mAh/cm$^2$ and a thickness of 60 μm is produced by applying constant current for 8 hours. The higher loading samples (120 μm and 240 μm) are produced by holding the constant current for 16 hours and 32 hours, respectively. The polycrystalline (110), (101), and pure (110) samples were prepared by pulsed electrodeposition. The polycrystalline sample was prepared by applying 30 mA/cm$^2$ pulses for 2 seconds with 5 seconds rest between pulses. During the rest step, no current was applied and the open circuit voltage (OCV) was monitored. An electrode with a loading of 4 mAh/cm$^2$ and a thickness of 60 μm is produced when 460 on/off cycles are applied. The higher loading samples (120 μm and 240 μm) are produced by increasing the number of pulses to 920, and 1840, respectively. To produce the (110), (101) orientation, 20 mA/cm$^2$ pulses were applied for 5 seconds, with 5 seconds rest between pulses. An electrode with a loading of 4 mAh/cm$^2$ and a thickness of 60 μm is produced when 280 on/off cycles are applied. The higher loading samples (120 μm and 240 μm) are produced by increasing the number of pulses to 560, and 1120, respectively. For the pure (110) orientation, 20 mA/cm$^2$ pulses were applied for 2 seconds, with 5 seconds rest between pulses. An electrode with a loading of 4 mAh/cm$^2$ and a thickness of 60 μm is produced when 700 on/off cycles are used. The higher loading samples (120 μm and 240 μm) are produced by increasing the number of pulses to 1,400, and 2,800, respectively. After finishing deposition for the given orientations of $LiCoO_2$, the samples were taken out of the bath and rinsed with water after cooling down to remove the residual salts. A nickel (1100 alloy) plate was used as the counter electrode for all depositions.

FIG. 2A through FIG. 2E demonstrate that XABC LCO can be plated with the (110), the (104), the (101) and the (003) planes oriented in relation to the substrate, which is important for traditional liquid electrolyte-based Li-ion batteries as well as for solid-state batteries. The cycle life in commercial liquid electrolyte of DirectPlate™ LCO is drastically affected by orientation as also shown in these figures.

More particularly, FIG. 2A shows SEM images of LCO in the following crystallographic orientations: (003) oriented 10; (104), (101), (110) oriented 12; (101), (110) oriented 14; and (110) oriented 16. A 80 μm scale is provided to illustrate relative size. FIG. 2B are schematics showing the different crystallographic orientations that enable the described technology as follows: (110) oriented 18; (101) oriented 20; (104) oriented 22; and (003) oriented 24. The orientations are shown in relation to the plane of a substrate 26. FIG. 2C shows X-ray powder diffraction (XRD) of LCO for the following crystallographic orientations: (003) oriented 28; polycrystalline 30; (110), (101) oriented 32; and (110) oriented 34. FIG. 2D is a graph illustrating cycle life of LCO in the (110) orientation at two different cut-off potentials (4.3 V upper trace 36 and 4.5 V lower trace 38, both vs Li/Li$_+$). FIG. 2E is a graph illustrating cycle life of LCO in the (003) orientation at two different cut-off potentials (4.3 V upper trace 40 and 4.5 V lower trace 42, both vs Li/Li$_+$). Clearly, the (110) orientation supports longer cycle life for both 4.3 and 4.5V vs Li/Li$^+$ voltage cut-off criteria.

FIG. 3 shows the galvanostatic profile XABC grown in the (110) orientation that is measured by galvanostatic intermittent titration technique (in a three-electrode configuration) is 10$^{-7}$, which is at least two-orders of magnitude higher than slurry composite electrodes. The ionic conductivity serves to increase the maximum charge and discharge rates, and to decrease resistance-based heating that can initiate unsafe thermal run-away and remove the requirement of costly and bulky cooling equipment.

The orientation also profoundly affects the kinetics of the electrode. In FIG. 4A through FIG. 4F, a 60 μm XABC LCO electrode that is oriented in the (110) orientation is compared against a commercial LCO electrode in a half-cell using a lithium anode and liquid electrolyte.

FIG. 4A is an SEM of a 60 μm XABC LCO electrode that is oriented in the (110) direction, showing a cross-section 44, a zoomed in view 46, a top down view 48, and a macro view 50. The morphology in FIG. 4A is consistent with what is expected for an electrode oriented in the (110) alignment. FIG. 4B is an XRD of a 60 μm XABC LCO electrode oriented in the (110) direction. FIG. 4B identifies this electroplated LCO electrode having a preferential (110) orientation through the intense peak at about 67° 2θ. The small peak at about 37° 2θ indicates there is some (101) present, which has similarly fast kinetics.

The galvanostatic trace at various rates of discharge of the 60 μm XABC LCO electrode oriented in the (110) direction and the commercial sample are shown in FIG. 4C and FIG. 4D, respectively, which both have similar areal capacity at a slow 10 hour discharge rate (where the full capacity can be extracted). The XABC LCO electrode is about 20 μm thinner than the commercial sample because the density is about 99% compared to about 70% in the commercial sample. These electrodes were evaluated at faster rates, which is shown in the galvanostatic profile in FIG. 4C and FIG. 4D along with Table 1, which shows that the capacity retention is comparable despite the XABC LCO electrode being significantly denser. To put a fine point on this, denser electrodes are favorable because they are thinner for an equivalent amount of material, but the rate the battery can charge and discharge suffers, which occurs at a lower level for DirectPlate™ LCO. The difference between commercial electrodes and DirectPlate™ LCO is the orientation in the (110) direction enables good transport despite the high density.

FIG. 4E and FIG. 4F present the same data from FIG. 4C and FIG. 4D, respectively, but now plotted with respect to the volumetric capacity (taking into account the thickness). Most notably, the volumetric capacity retention of the DirectPlate™ LCO at 2 C is nearly 40% higher than a commercial electrode as a result of the higher density and preferred orientation. It is clear that orientation plays a significant, and practical, role in the ionic and electronic transport phenomena occurring in the electrode.

FIG. 5A and FIG. 5B show the SEM of a 120 μm XABC (110) oriented electrode with similar morphology to the SEM of the thinner electrode already shown in FIG. 4A indicating this orientation can be propagated to thicker electrodes. FIG. 5A shows a top-down view 52 and FIG. 5B shows a cross-section view 54.

FIG. 5C shows the galvanostatic profile of the 120 μm (110) oriented XABC electrode during the first 10 hour charge and discharge cycle in commercial liquid electrolyte (half cell with lithium metal counter electrode). It is important to note that the areal capacity of this sample is nearly 8 mAh/cm², which is about double the best state of the art commercial LCO electrode. The high loading increases the energy density of a cell (solid or liquid electrolyte) by reducing the number of layers in a cell (of a specific capacity), which removes inactive materials that take up volume and mass. FIG. 5D shows the rate capability of the 120 μm XABC (110) oriented electrode. From FIG. 5D it can be seen that the rate capability of this 120 μm XABC electrode is impressive in that more than half the capacity ca be extracted in just 15 minutes. FIG. 5E is an XRD of the 120 μm XABC (110) oriented electrode. The dominant (110) orientation enables this both thick and dense electrode to utilize 146 mAh/g capacity (nearly the full specific capacity of LCO). It will be appreciated that the first cycle columbic efficiency is >92%, which is at the level of commercial acceptability.

FIG. 6A and FIG. 6B show the SEM of a 240 μm XABC (110) oriented electrode, again, with similar morphology to the SEM of both the thinner electrodes already shown in FIG. 4A and FIG. 5A, respectively. FIG. 6A shows a cross-section view 56. FIG. 6B shows a top down view 58, two top down zoomed in views 60, 62, and a zoomed out view 64. The galvanostatic trace shown in FIG. 6C of the 240 μm XABC electrode during the first 10 hour charge cycle 66 and discharge cycle 68 in liquid electrolyte (half cell with lithium metal counter electrode). It is important to note that the areal capacity of this sample is nearly 15 mAh/cm², which is 4× the best state-of the art commercial LCO electrode. The XRD of FIG. 6D shows that dominant (110) orientation enables both a thick and dense electrode to utilize 135 mAh/g capacity (nearly the full specific capacity of LCO). It will be appreciated that the first cycle columbic efficiency is >90%, which is at the level of commercial acceptability. Such a thick electrode that still delivers nearly the full specific capacity of LCO further demonstrate the ability of orientation and grain control to enable nearly fully dense and ultra thick electrodes for both liquid electrolytes and solid-state batteries.

FIG. 7 illustrates a non-limiting example of a solid-state battery configuration 70 according to the present disclosure. The battery shown in FIG. 7 comprises a first current collector 72, an anode layer 74 adjacent the first current collector 72, a solid state electrolyte layer 76 adjacent the anode layer 74, a cathode layer 78 adjacent the solid state electrolyte layer 76, and a second current collector 80 adjacent the cathode layer 78. In one embodiment, the cathode layer 78 may comprise a layer of fully dense DirectPlate™ LiCoO₂ (LCO) material. In one embodiment, the LCO material may have a crystal orientation selected from the group consisting of (110); (101); (104); and (003). In one embodiment, the layer of LCO material may have a smooth surface facing the electrolyte layer. In one embodiment, the first current collector 72 may comprise a copper-based material. In one embodiment, the second current collector 80 may comprise an aluminum-based material. In one embodiment, the anode layer 74 may comprise a lithium-ion based active material such as lithium, silicon, tin, graphite, or a graphite silicon composite. Examples of solid-state electrolytes that can be used include, but are not limited to, Al-doped LLZO, Argyrodite, Ga-doped LLZO, GeS₂, LAGP, LATP, LGPS, Li₂S, LISICON, Lithium Phosphate (Li₃PO₄), LiPON, LLZO, LPS, Nb-doped LLZO, Sodium Beta Alumina, Sulfide Solid Electrolytes (amorphous, partly crystalline, fully crystalline forms of Li₂S—P₂S₅, Li₂S—P₂S₅—GeS₂, Li₂S—P₂S₅—X, where X is Cl, Br, I), Ta-doped LLZO, and W-doped LLZO.

The most common (bulk) solid-state battery designs typically use a solid electrolyte intermixed homogeneously entirely throughout a porous electrode in addition to a solid electrolyte separator (as opposed to only a solid electrolyte separator layer between the anode and cathode) to ensure high electronic and ionic connectivity as well as maximum electrode material utilization. The intermixed electrode design enables the solid electrolyte regions to be in close contact with the active material, and ensures that ion conduction occurs dominantly through the solid electrolyte rather than the much more resistive porous active material composite. The more preferable solid-state battery design, which is unlikely possible with thick commercial electrodes, is to use the solid-state electrolyte as a separating layer between the anode and cathode. This arrangement is preferable because less solid electrolyte is needed (cheaper, higher energy), and the manufacturing is simplified. Particularly in the case where the solid electrolyte only interacts with the top surface, the ability to control orientation is crucially important to enable low resistance electrode/electrolyte interfaces, which affect power, heat generation, safety, cycle life, and many other technologically relevant performance metrics.

Another important parameter for integration of a solid-state electrolyte with our XABC cathode are specific morphologies, such as the preferred column-like morphologies shown in FIG. 8A and FIG. 8B. FIG. 8A is a SEM cross-section view of LCO 82 with columnar morphology and (110) crystallographic orientation. FIG. 8B is a schematic view 84 of the columns 86 in the LCO 82. These structures are compatible with both liquid and solid-state electrolytes. Moreover, the columnar structure is preferred because the columns can form as single-crystals in the growth direction of the electrode, which effectively eliminates grain boundaries. In the absence of resistive grain boundaries, the charge and discharge rates will be higher, and the heat generation at higher charge and discharge rates will be lower.

Yet another morphology that LCO can be grown in is shown in FIG. 8C and FIG. 8D. FIG. 8C is a SEM cross-section view of XABC LCO 88 with a dense dendritic (110) morphology 90. FIG. 8D is a schematic 92 of LCO 94 with non-columnar grain boundaries 96. Both of these non-columnar structures are compatible with liquid electrolyte, and may be compatible with solid state electrolytes.

FIG. 9A shows a cross section SEM of XABC LCO 98 grown with low surface roughness and a smooth columnar morphology. FIG. 9B shows a top surface SEM of XABC LCO 100 (and zoomed in view 102) grown with low surface roughness and a smooth columnar morphology. FIG. 9C shows an optical profilometry measurement of XABC LCO, which was grown with low surface roughness. The Rz here, calculated from the line scan, is 1.831 μm. The surface roughness can be controlled from about 1.8 μm to about 5 μm (measured values), but it is likely the roughness could be varied beyond these limits (likely to <100 nanometers). Surface roughness is important for use in both traditional liquid and solid-state electrolytes. In liquids, the roughness is a component of the charge transfer resistance and capacitance, which is a factor that can determine important electrochemical and performance metrics of a battery as well as additional sites for electrolyte breakdown.

It will be appreciated that in a solid-state cell the electrolyte replaces the separating membrane that "lays" on top of the electrode to prevent shorts, but since it typically deposits or flows in the valleys, the peak to valley dimension determines the minimum thickness of the solid-state electrolyte separating layer. It is possible to short the cell if the electrolyte is not thick enough to completely separate the anode and the cathode. Moreover, the cathode surface roughness influences the morphology of a lithium anode in a solid-state-lithium-metal-battery. This anode structure will affect the performance of the cell. For example, cell swelling properties, cycle life, and cell impedance (not meant to be exhaustive) will be affected by the surface structure of the anode. FIG. 10A and FIG. 10B are schematic diagrams of batteries 104, 106 with cathodes 108, 110, respectively. In battery 104, the cathode 108 has low surface roughness in comparison to the cathode 110 of battery 106. Beneficially, in battery 104, the electrolyte layer 112 can be "thin" in contrast to the electrolyte layer 114 of battery 110.

Commercial electrodes typically have a maximum density of about 70% to about 80%. On the other hand, the density of the XABC LCO can be grown between about 50% and nearly 100% dense, with the latter being preferred. If the solid-state battery embodiment in FIG. 7 is used, the density is desired to be close to 100%. Furthermore, the high density of the active material film increases the energy density compared to lower density electrodes. In one preferred embodiment, the only porosity in the films comes from the space between the columnar crystallites. FIG. 11 is a SEM of columnar XABC LCO 116 illustrating that the void distribution is partitioned as striations between the columns. When performing theoretical mass calculations on the samples used to implement the technology described herein, the density of the films is about 99% to about 100%. For example, in the case of the 15 μm thick film shown in FIG. 11, the calculation below is used to calculate the density.

$$\frac{7.3 \text{ mg}}{1 \text{ cm}^2 \times 0.0015 \text{ cm}} = 4.87 \text{ mg}/\text{cm}^3$$

$$\frac{4.87 \text{ mg}/\text{cm}^3}{4.9 \text{ mg}/\text{cm}^3} = 99.4\% \text{ } DenseLCOFilm$$

FIG. 12A through FIG. 14B show ex-situ electrochemical-XRD characterization of commercial LCO, XABC LCO in the (110), and (003) orientation, respectively. FIG. 12A shows voltage vs. capacity of commercial LCO stopped at different potentials for XRD analysis at those various potentials. FIG. 12B is an XRD of commercial LCO at different cut-off potentials. FIG. 13A shows voltage vs. capacity of (110) oriented XABC LCO stopped at different potentials (denoted by dots) for XRD analysis at those various potentials. FIG. 13B shows corresponding XRD evolution of (110) oriented XABC LCO at different cut-off potentials. FIG. 14A shows voltage vs. capacity of (003) oriented XABC LCO stopped at different potentials denoted by circles. FIG. 14B shows corresponding XRD evolution of (003) oriented Xerion LCO at different cut-off potentials. The large dots in the XRDs of FIG. 12A, FIG. 13A, and FIG. 14A indicate the points where the XRD spectrum was collected.

Typically, the reversibility of LCO is good if the upper voltage is limited to about 4.3 V vs Li/Li$_+$. Above this voltage two major degradation mechanisms occur: 1) the electrolyte begins to break down at an accelerated pace, and 2) Beyond 4.5V vs Li/Li$_+$ a largely irreversible phase change from a O3 to the O1 stacking motif occurs, which rapidly degrades the cycle life (O3 and O1 denote the stacking sequence of the atomic layers that build a crystalline material). Chen et al., "Staging Phase Transitions in Li$_x$CoO$_2$,", Journal of The Electrochemical Society, 149 (12) A1604-A1609 (2002), report on the crystallographic changes that occur in commercial LCO at different voltages. They report that: "during charge, the 003 peak from the O3 phase gradually disappears in the beginning, and a peak from the X phase simultaneously grows. After this phase transition is finished, the peak from the X-phase diminishes, while the 001 peak from the O1 phase grows. At 4.75 V, one can see the 001 peak from the O1 phase in the corresponding XRD pattern even though there is a broad shoulder on its left side that indicates the phase transition is not complete yet."

We carried out similar experiments to ascertain if oriented DirectPlate™ LCO was more resistant to this type of structural degradation. FIG. 12 shows our data on the same type of material used by Chen et. al. (solid-state synthesized LCO), which serves as a baseline for the investigation into our DirectPlate™ electrodes. As expected, the baseline material behaved similarly to Dunn's et. al. publication. However, the case is different for the (110) phase of XABC LCO as shown in FIG. 13A and FIG. 13B. The XRD peaks initially assigned to LCO are still present at 4.7V, and importantly no new peaks associated with the O1 phase are present. In FIG. 14A and FIG. 14B we show a similar trend for the (003) XABC sample. The original XRD peaks initially assigned to LCO are still present at 4.7V, and the doublet peak at 66° remains indicating that the layered structure is preserved. The additional peak appearing at 20° indicates that there is some conversion from O3-O1, but it can be seen that the conversion ratio is much less (indicated by the ratio of the peaks at 20° and the original peak at 18°). This indicates that both the (110) and (003) XABC materials are more phase-stable than commercial material. This extra stability enables our oriented XABC LCO to be operated at higher voltages in both solid-state and liquid electrolytes more stably, which ultimately increases the energy density significantly.

The difference in structural changes between the commercial and the (110) and (003) oriented XABC LCO materials also translates to their stability at high temperatures. The onset temperature of thermal runaway for an active material (e.g., LCO) is a critical safety metric. Thermal runaway occurs when an electrode experiences an increase in temperature above a certain value, at which point the temperature continues to increase through self-sustained thermal processes leading to fire and explosions.

The thermal stability of commercial and (110) and (003) oriented XABC LCO electrodes were tested and compared. The test was carried out as follows:

1. All electrodes were cycled to 100% state of charge (SOC), which is defined as the charge that can be extracted during constant current discharge over a five hour period between 3.0V and 4.3V vs. Li/Li$^+$.
2. The LCO electrodes were dried overnight before assembling LCO/Li cells in an organic electrolyte and encased in a 2025 type coin cell.
3. The LCO/Li cells were assembled in 2025 type coin cell. The cell was allowed to rest for 3 hours then charged using constant current (C/5) to 4.3V followed by a constant voltage hold until the current dropped to C/20. The discharge was carried out by a constant current of C/5 to 3V. After 4 charge and discharge cycles the cell was charged at C/5 to 4.3V and stopped.
4. The cells were then disassembled in glove box with an argon environment without rinsing the electrolyte from the electrode (the electrolyte was not rinsed to mimic practical thermal runaway conditions). These electrodes were sealed in a Teflon jar (in a glove box).
5. The Teflon jar was heated from RT to 215° C. and held at that temperature for 10 minutes.
6. After this heat treatment the LCO samples were assembled in 2025 coin cells for analysis.
7. These cells were discharged with the same protocol mentioned in above.

The results of this test for the commercial baseline sample (loading of 2.3 mAh/cm$^2$) are shown in FIG. 15A, which is a galvanostatic trace of a commercial LCO electrode that was used to precycle the electrode for thermal testing. As expected, the LCO undergoes irreversible degradation. The initial capacity of about 150 mAh/g reduces to about 80 mAh/g as illustrated in FIG. 15B which shows galvanostatic traces of the commercial LCO electrode in the presence of liquid electrolyte after a heat treatment at 215° C. for 10 minutes at 4.3V Li/Li$^+$. However, referring now to FIG. 16A and FIG. 16B, the case is significantly different for the (003) oriented XABC LCO electrode sample of similar capacity. FIG. 16A shows a galvanostatic trace of a XABC LCO electrode, oriented in the (003) direction, that was used to precycle the electrode for thermal testing. FIG. 16B shows galvanostatic traces of a XABC LCO electrode, oriented in the (003) direction, in the presence of liquid electrolyte, after a heat treatment at 215° C. for 10 minutes at 4.3V Li/Li$^+$.

The initial capacity of about 150 mAh/g undergoes a small reduction to 120 mAh/g after the heat treatment process which is significantly better than the commercial LCO electrode. The capacity retention after this thermal stability test is the best for the (110) oriented XABC LCO electrode sample. Referring to FIG. 17A and FIG. 17B, the initial capacity of about 140 mAh/g remains largely unchanged after the heat treatment process. FIG. 17A shows a galvanostatic trace of a XABC LCO electrode, oriented in the (110) direction, that was used to precycle the electrode for thermal testing. FIG. 17B shows galvanostatic traces of a XABC LCO electrode, oriented in the (110) direction, in the presence of liquid electrolyte, after a heat treatment at 215 C for 10 minutes at 4.3V Li/Li$^+$. These data suggest that the (110) and (003) oriented XABC LCO electrodes will be safer than commercial LCO when the temperature is increased close to the onset temperature of thermal runaway.

DSC (differential scanning calorimetry) was also performed to further corroborate the thermal stability. DSC, a common technique used to characterize the thermal processes in li-ion batteries, was utilized to quantify the heat flow as a function of temperature. FIG. 18 shows the DSC data collected for both XABC LCO and commercial LCO. At 100% SOC, the XABC LCO electrode sample (dashed line) showed less heat flow compared to commercial LCO up to about 260 C. Furthermore, the XABC LCO electrode sample shows its major exothermic process begins about 260 C compared to about 215 C for commercial LCO. Moreover, a higher onset temperature is desired because it provides a safety buffer against thermal runaway.

FIG. 19A and FIG. 19B show a characteristic voltage vs. SOC curve for XABC LCO and a TEGDME based polymer electrolyte, which demonstrates a functional battery employing a XABC LCO electrode with low surface roughness, nearly 100% dense, and (110) orientation. FIG. 19A shows a galvanostatic trace of XABC LCO‖TEGDME polymer electrolyte‖Lithium that is constructed according to the illustration in FIG. 7. FIG. 19B shows cycle life stability graph of XABC LCO‖TEGDME polymer electrolyte-‖Lithium that is constructed according to the illustration in FIG. 7.

These data underpin the importance of the synergy between the electrode parameters like density, surface roughness, and solid electrolyte. As expected, we find orientation has a profound effect on battery performance because of a detailed interplay of surface energies, surface reactivities, diffusivity and ionic/electronic conductivity.

A common method to produce LCO for solid-state applications is sputter coating, but a significant limitation to sputter coating LCO is the requirement of a post deposition heat treatment step. This additional step increases the manufacturing complexity and cost, as well as limits the choice of compatible substrates. FIG. 20 shows a galvanostatic trace of a XABC LCO with and without heat treatments. As can be seen from FIG. 20, the XABC electrodes described herein do not require this additional heat treatment step.

From the description herein, it will be appreciated that that the present disclosure encompasses multiple implementations which include, but are not limited to, the following:

An electrode, an electrode in an active stack for a battery, or an electrode in a battery, wherein the electrode comprises a LiCoO$_2$ (LCO) electrode layer having a crystal orientation selected from the group consisting of: (110); (101); (104); and (003).

An electrode, an electrode in an active stack for a battery, or an electrode in a battery; wherein the electrode comprises a LiCoO$_2$ (LCO) electrode layer having a crystal orientation selected from the group consisting of: (110); (101); (104); and (003); and wherein the electrode layer comprises a material having one or more following properties: (i) a high density; (ii) a thickness from less than about 1 μm to about 200 μm or greater; (iii) at least one smooth surface; and (iv) surfaces with continuous grains between the surfaces that create conductive pathways between the surfaces.

An improved electrode comprising: a fully dense $LiCoO_2$ (LCO) electrode layer; said electrode layer having a crystal orientation selected from the group consisting of: (110); (101); (104); and (003).

An electrode for a battery, the electrode comprising: a layer of fully dense $LiCoO_2$ (LCO) material; said layer of $LiCoO_2$ (LCO) material having a crystal orientation selected from the group consisting of: (110); (101); (104); and (003).

An active stack for a battery, the active stack comprising: an anode layer; a cathode layer; and an electrolyte layer between the anode layer and the cathode layer; wherein the cathode layer comprises a layer of fully dense $LiCoO_2$ (LCO) material; and wherein the $LiCoO_2$ (LCO) material has a crystal orientation selected from the group consisting of: (110); (101); (104); and (003).

The active stack of any preceding or following implementation: wherein the electrolyte layer comprises a solid-state electrolyte layer; and wherein the layer of $LiCoO_2$ (LCO) material has a smooth surface facing the electrolyte layer.

The active stack of any preceding or following implementation, wherein the anode layer comprises a layer of lithium-ion based active material (e.g., lithium, silicon, tin, graphite, and graphite/silicon composites).

A battery, comprising: a first current collector; an anode layer adjacent the first current collector; an electrolyte layer adjacent the anode layer; a cathode layer adjacent the electrolyte layer; and a second current collector adjacent the cathode layer; wherein the cathode layer comprises a layer of fully dense $LiCoO_2$ (LCO) material; and wherein the $LiCoO_2$ (LCO) material has a crystal orientation selected from the group consisting of: (110); (101); (104); and (003).

The battery of any preceding or following implementation: wherein the electrolyte layer comprises a solid-state electrolyte layer; and wherein the layer of $LiCoO_2$ (LCO) material has a smooth surface facing the electrolyte layer.

The battery of any preceding or following implementation, wherein the anode layer comprises a layer of lithium-ion based active material (e.g., lithium, silicon, tin, graphite, and graphite/silicon composites).

The battery of any preceding or following implementation, wherein the first current collector comprises a copper-based material.

The battery of any preceding or following implementation, wherein the second current collector comprises an aluminum-based material.

An improved electrode comprising: a fully dense $LiCoO_2$ (LCO) electrode layer; said electrode layer having a crystal orientation selected from the group consisting of: (110); (101); (104); and (003); said electrode layer having a thickness from less than about 1 μm to about 200 μm or greater; said electrode layer having at least one smooth surface; said electrode layer having surfaces with continuous grains between the surfaces that create conductive pathways between the surfaces.

An electrode for a battery, the electrode comprising: a layer of fully dense $LiCoO_2$ (LCO) material; said layer of $LiCoO_2$ (LCO) material having a crystal orientation selected from the group consisting of: (110); (101); (104); and (003); said electrode layer having a thickness from less than about 1 μm to about 200 μm or greater; said electrode layer having at least one smooth surface; said electrode layer having surfaces with continuous grains between the surfaces that create conductive pathways between the surfaces.

An active stack for a battery, the active stack comprising: an anode layer; a cathode layer; and an electrolyte layer between the anode layer and the cathode layer; said cathode layer comprising a layer of fully dense $LiCoO_2$ (LCO) material; said $LiCoO_2$ (LCO) material having a crystal orientation selected from the group consisting of: (110); (101); (104); and (003); said cathode layer having a thickness from less than about 1 μm to about 200 μm or greater; said cathode layer having at least one smooth surface; said cathode layer having surfaces with continuous grains between the surfaces that create conductive pathways between the surfaces.

The active stack of any preceding or following implementation: wherein the electrolyte layer comprises a solid-state electrolyte layer; and wherein the layer of $LiCoO_2$ (LCO) material has a smooth surface facing the electrolyte layer.

The active stack of any preceding or following implementation, wherein the anode layer comprises a layer of lithium-ion based active material (e.g., lithium, silicon, tin, graphite, and graphite/silicon composites).

A battery, comprising: a first current collector; an anode layer adjacent the first current collector; an electrolyte layer adjacent the anode layer; a cathode layer adjacent the electrolyte layer; and a second current collector adjacent the cathode layer; said cathode layer comprising a layer of fully dense $LiCoO_2$ (LCO) material; and said $LiCoO_2$ (LCO) material having a crystal orientation selected from the group consisting of: (110); (101); (104); and (003); said cathode layer having a thickness from less than about 1 μm to about 200 μm or greater; said cathode layer having at least one smooth surface; said cathode layer having surfaces with continuous grains between the surfaces that create conductive pathways between the surfaces.

The battery of any preceding or following implementation: wherein the electrolyte layer comprises a solid-state electrolyte layer; and wherein the layer of $LiCoO_2$ (LCO) material has a smooth surface facing the electrolyte layer.

The battery of any preceding or following implementation, wherein the anode layer comprises a layer of lithium-ion based active material.

The battery of any preceding or following implementation, wherein the first current collector comprises a copper-based material.

The battery of any preceding or following implementation, wherein the second current collector comprises an aluminum-based material.

An XABC method of forming an electrode.

An XABC LCO electrode.

An XABC LCO electrode fabricated according to an XABC method.

A device employing an XABC LCO electrode.

The structure of any preceding implementation wherein the LCO comprises XABC LCO.

A method of fabricating the structure of any preceding implementation.

A solid-state implementation of XABC LCO.

An electrode, active stack, battery, device or method of any preceding implementation wherein the electrode has a density from about 10% to about 100% for liquid electrolytes and possibly for solid-state electrolytes.

An electrode for a battery, the electrode comprising: a $LiCoO_2$ (LCO) electrode layer having a crystal orientation selected from the group consisting of: (110); (101); (104); and (003).

An electrode for a battery, the electrode comprising: a $LiCoO_2$ (LCO) electrode layer having a crystal orientation selected from the group consisting of: (110); (101); (104); and (003); the electrode layer comprising a material having one or more following properties: (i) a high density; (ii) a thickness from less than about 1 μm to about 200 μm or greater; (iii) at least one smooth surface; and (iv) surfaces with continuous grains between the surfaces that create conductive pathways between the surfaces.

An electrode for a battery, the electrode comprising: a fully dense $LiCoO_2$ (LCO) electrode layer; said electrode layer having a crystal orientation selected from the group consisting of: (110); (101); (104); and (003).

An electrode for a battery, the electrode comprising: a layer of fully dense $LiCoO_2$ (LCO) material; said layer of $LiCoO_2$ (LCO) material having a crystal orientation selected from the group consisting of: (110); (101); (104); and (003).

An electrode for a battery, the electrode comprising: a fully dense $LiCoO_2$ (LCO) electrode layer; said electrode layer having a crystal orientation selected from the group consisting of: (110); (101); (104); and (003); said electrode layer having a thickness from less than about 1 μm to about 200 μm or greater; said electrode layer having at least one smooth surface; said electrode layer having surfaces with continuous grains between the surfaces that create conductive pathways between the surfaces.

An electrode for a battery, the electrode comprising: an electrode layer of fully dense $LiCoO_2$ (LCO) material; said electrode layer of $LiCoO_2$ (LCO) material having a crystal orientation selected from the group consisting of: (110); (101); (104); and (003); said electrode layer having a thickness from less than about 1 μm to about 200 μm or greater; said electrode layer having at least one smooth surface; said electrode layer having surfaces with continuous grains between the surfaces that create conductive pathways between the surfaces.

The electrode of any preceding implementation, wherein the electrode is a component of a battery.

In a battery having an electrode layer, an improvement comprising: a $LiCoO_2$ (LCO) electrode layer having a crystal orientation selected from the group consisting of: (110); (101); (104); and (003).

In a battery having an electrode layer, an improvement comprising: a fully dense $LiCoO_2$ (LCO) electrode layer; said electrode layer having a crystal orientation selected from the group consisting of: (110); (101); (104); and (003).

In a battery having an electrode layer, an improvement comprising: a fully dense $LiCoO_2$ (LCO) electrode layer; said electrode layer having a crystal orientation selected from the group consisting of: (110); (101); (104); and (003); said electrode layer having a thickness from less than about 1 μm to about 200 μm or greater; said electrode layer having at least one smooth surface; said electrode layer having surfaces with continuous grains between the surfaces that create conductive pathways between the surfaces.

In a battery having an electrode layer, an improvement comprising: a $LiCoO_2$ (LCO) electrode layer having a crystal orientation selected from the group consisting of: (110); (101); (104); and (003); the electrode layer comprising a material having one or more following properties: (i) a high density; (ii) a thickness from less than about 1 μm to about 200 μm or greater; (iii) at least one smooth surface; and (iv) surfaces with continuous grains between the surfaces that create conductive pathways between the surfaces.

In a battery having an electrode layer, an improvement comprising: a layer of fully dense $LiCoO_2$ (LCO) material; said layer of $LiCoO_2$ (LCO) material having a crystal orientation selected from the group consisting of: (110); (101); (104); and (003).

In a battery having an electrode layer, an improvement comprising: an electrode layer of fully dense $LiCoO_2$ (LCO) material; said electrode layer of $LiCoO_2$ (LCO) material having a crystal orientation selected from the group consisting of: (110); (101); (104); and (003); said electrode layer having a thickness from less than about 200 μm or greater; said electrode layer having at least one smooth surface; said electrode layer having surfaces with continuous grains between the surfaces that create conductive pathways between the surfaces.

An active stack for a battery, the active stack comprising: an anode layer; a cathode layer; and an electrolyte layer between the anode layer and the cathode layer; wherein the cathode layer comprises a layer of fully dense $LiCoO_2$ (LCO) material; and wherein the $LiCoO_2$ (LCO) material has a crystal orientation selected from the group consisting of (110); (101); (104); and (003).

An active stack for a battery, the active stack comprising: an anode layer; a cathode layer; and an electrolyte layer between the anode layer and the cathode layer; said cathode layer comprising a layer of fully dense $LiCoO_2$ (LCO) material; said $LiCoO_2$ (LCO) material having a crystal orientation selected from the group consisting of: (110); (101); (104); and (003); said cathode layer having a thickness from less than about 1 μm to about 200 μm or greater; said cathode layer having at least one smooth surface; said cathode layer having surfaces with continuous grains between the surfaces that create conductive pathways between the surfaces.

The active stack of any preceding implementation: wherein the electrolyte layer comprises a solid-state electrolyte layer; and wherein the layer of $LiCoO_2$ (LCO) material has a smooth surface facing the electrolyte layer.

The active stack of any preceding implementation, wherein the anode layer comprises a layer of lithium-ion based active material.

A battery, comprising: a first current collector; an anode layer adjacent the first current collector; an electrolyte layer adjacent the anode layer; a cathode layer adjacent the electrolyte layer; and a second current collector adjacent the cathode layer; wherein the cathode layer comprises a layer of fully dense $LiCoO_2$ (LCO) material; and wherein the $LiCoO_2$ (LCO) material has a crystal orientation selected from the group consisting of: (110); (101); (104); and (003).

A battery, comprising: a first current collector; an anode layer adjacent the first current collector; an electrolyte layer adjacent the anode layer; a cathode layer adjacent the electrolyte layer; and a second current collector adjacent the cathode layer; said cathode layer comprising a layer of fully dense $LiCoO_2$ (LCO) material; and said $LiCoO_2$ (LCO) material having a crystal orientation selected from the group consisting of: (110); (101); (104); and (003); said cathode layer having a thickness from less than about 1 μm to about 200 μm or greater; said cathode layer having at least one smooth surface; said cathode layer having surfaces with continuous grains between the surfaces that create conductive pathways between the surfaces.

The battery of any preceding implementation: wherein the electrolyte layer comprises a solid-state electrolyte layer; and wherein the layer of $LiCoO_2$ (LCO) material has a smooth surface facing the electrolyte layer.

The battery of any preceding implementation, wherein the anode layer comprises a layer of lithium-ion based active material.

17            18

The battery of any preceding implementation, wherein the first current collector comprises a copper-based material.

The battery of any preceding implementation, wherein the second current collector comprises an aluminum-based material.

A method of forming an electrode material, comprising: forming a mixture of LiOH and KOH; forming a melt by heating the mixture of LiOH and KOH; adding CoO and dissolving the CoO in the melt; and inserting an aluminum substrate into the melt and electroplating $LiCoO_2$ onto the aluminum substrate with a crystallographic orientation selected from the group consisting of: (110); (101); (104); and (003); wherein the crystallographic orientation is a function of the electroplating.

The method of any preceding implementation, wherein the mixture of LiOH and KOH comprises about 8 g KOH and about 0.75 g LiOH.

The method of any preceding implementation, further comprising: heating the mixture of LiOH and KOH to about 350° C.; and adding about 0.5 g CoO to the mixture.

The method of any preceding implementation, further comprising forming (003) oriented $LiCoO_2$ by applying a low constant current density of about 1 mA/cm$^2$ between a working electrode and a counter electrode.

The method of any preceding implementation, further comprising forming (001) oriented $LiCoO_2$ by applying about 30 mA/cm$^2$ pulses between a working electrode and a counter electrode for about 2 seconds with about 5 seconds rest between pulses.

The method of any preceding implementation, further comprising forming polycrystalline (110), (001) oriented $LiCoO_2$ by applying about 20 mA/cm$^2$ pulses between a working electrode and a counter electrode for about 5 seconds with about 5 seconds rest between pulses.

The method of any preceding implementation, further comprising forming (110) oriented $LiCoO_2$ by applying about 20 mA/cm$^2$ pulses between a working electrode and a counter electrode for about 2 seconds with about 5 seconds rest between pulses.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Tabulated values of capacity at various rates of a 60 μm XABC LCO electrode oriented in the (110) direction | | |
| --- | --- | --- |
| Discharge Rate | XABC LCO | Commercial Slurry Cast LCO |
| C/5 | 100% | 100% |
| C/2 | 98.7% | 98.1% |
| 1 C | 93.6% | 94.3% |
| 2 C | 73.5% | 74.4% |

What is claimed is:

1. An electrode comprising:
   (a) an electroplated electrode layer of fully dense $LiCoO_2$ (LCO) material;
   (b) said $LiCoO_2$ (LCO) electrode layer having a (003) or a (101) or a (104) or a (110) crystal orientation;
   (c) wherein the electrode layer has top and bottom surfaces with continuous grains between the surfaces that create ion and electron conductive pathways between the surfaces;
   (d) wherein the electrode layer has a thickness from about 10 μm to about 200 μm; and
   (e) wherein the electrode layer having has at least one smooth surface with a roughness of Rz=~10 μm.

2. The electrode of claim 1, wherein the electrode is a component of a battery.

3. An active stack for a battery, the active stack comprising:
   an anode layer;
   a cathode layer; and
   an electrolyte layer between the anode layer and the cathode layer;
   wherein the cathode layer comprises an electroplated layer of fully dense $LiCoO_2$ (LCO) material;
   wherein the $LiCoO_2$ (LCO) material has a (003) or a (101) or a (104) or a (110) crystal orientation; and
   wherein the electroplated layer has at least one smooth surface with a roughness of Rz=~10 μm.

4. The active stack of claim 3:
   wherein the electrolyte layer comprises a non-liquid electrolyte layer; and
   wherein the layer of $LiCoO_2$ (LCO) material smooth surface faces the electrolyte layer.

5. The active stack of claim 3, wherein the anode layer comprises a layer of lithium-ion based active material.

6. The active stack of claim 3, the active stack comprising:
   said cathode layer having a thickness from about 10 μm to about 200 μm;
   said cathode layer having at least one smooth surface;
   said cathode layer having surfaces with continuous grains between the surfaces that create conductive pathways between the surfaces.

7. The active stack of claim 6:
   wherein the electrolyte layer comprises a non-liquid electrolyte layer; and
   wherein the layer of $LiCoO_2$ (LCO) material has a smooth surface facing the electrolyte layer.

8. The active stack of claim 6, wherein the anode layer comprises a layer of lithium-ion based active material.

9. A battery, comprising:
   a first current collector;
   an anode layer adjacent the first current collector;
   an electrolyte layer adjacent the anode layer;
   a cathode layer adjacent the electrolyte layer; and
   a second current collector adjacent the cathode layer;
   wherein the cathode layer comprises a layer of fully dense $LiCoO_2$ (LCO) material;
   wherein the $LiCoO_2$ (LCO) material has a (003) or a (101) or a (104) or a (110) crystal orientation; and
   wherein the electroplated layer has at least one smooth surface with a roughness of Rz=~10 μm.

10. The battery of claim 9:
    wherein the electrolyte layer comprises a non-liquid electrolyte layer; and
    wherein the layer of $LiCoO_2$ (LCO) material has a smooth surface facing the electrolyte layer.

11. The battery of claim 9, wherein the anode layer comprises a layer of lithium-ion based active material.

12. The battery of claim 9, wherein the first current collector comprises a copper-based material.

13. The battery of claim 9, wherein the second current collector comprises an aluminum-based material.

14. The battery of claim 9:
    said cathode layer having a thickness from 10 μm to about 200 μm; and
    said cathode layer having surfaces with continuous grains between the surfaces that create conductive pathways between the surfaces.

15. The battery of claim 14:
    wherein the electrolyte layer comprises a solid-state electrolyte layer; and wherein the layer of $LiCoO_2$ (LCO) material has a smooth surface facing the electrolyte layer.

16. The battery of claim 14, wherein the anode layer comprises a layer of lithium-ion based active material.

17. The battery of claim 14, wherein the first current collector comprises a copper-based material.

18. The battery of claim 14, wherein the second current collector comprises an aluminum-based material.

* * * * *